United States Patent [19]

Hiraoka et al.

[11] Patent Number: 5,775,811
[45] Date of Patent: Jul. 7, 1998

[54] TEMPERATURE SENSOR SYSTEM USING A MICRO-CRYSTALLINE SEMICONDUCTOR THIN FILM

[75] Inventors: Jun Hiraoka; Setsuo Kodato, both of Atsugi, Japan

[73] Assignee: Anritsu Corporation, Tokyo, Japan

[21] Appl. No.: 687,558

[22] PCT Filed: Dec. 8, 1995

[86] PCT No.: PCT/JP95/02520

§ 371 Date: Aug. 6, 1996

§ 102(e) Date: Aug. 6, 1996

[87] PCT Pub. No.: WO96/18871

PCT Pub. Date: Jun. 20, 1996

[30] Foreign Application Priority Data

Dec. 15, 1994 [JP] Japan ............................ 6-333348

[51] Int. Cl.⁶ ........................................ G01K 1/08
[52] U.S. Cl. .............. 374/185; 374/176; 374/171; 364/577; 364/557; 338/225 D
[58] Field of Search .................... 374/185, 171, 374/172, 176, 178; 364/577, 557; 338/225 D, 25; 327/572

[56] References Cited

U.S. PATENT DOCUMENTS

| | | | |
|---|---|---|---|
| 3,270,309 | 8/1966 | Vanik et al. | 338/22 SD |
| 3,292,129 | 12/1966 | Sanchez et al. | 338/22 SD |
| 3,780,322 | 12/1973 | Walters | 327/512 X |
| 4,751,655 | 6/1988 | Peacock | 364/577 X |
| 5,141,334 | 8/1992 | Castles | 338/22 SD X |
| 5,394,084 | 2/1995 | Snyder | 324/225 |
| 5,481,583 | 1/1996 | Heusher | 378/4 |
| 5,570,304 | 10/1996 | Mark et al. | 364/571.03 |

FOREIGN PATENT DOCUMENTS

| | | |
|---|---|---|
| 62-37145 | 9/1987 | Japan . |
| 5-87641 | 4/1993 | Japan . |
| 5-90011 | 4/1993 | Japan . |
| 5-332845 | 12/1993 | Japan . |

OTHER PUBLICATIONS

Anritsu Technical No. 67, pp. 15–21; issued Mar. 1994.
H.H. Sample; "Low–temperature Thermometry in High Magnetic Fields, V. Carbon–glass Resistors", Aug. 1982; pp. 1129–1135; Rev. Sci. Instru. vol. 53, No. 8.
K. Nara et al; "Development of Thin Wire Platinum Resistance Thermometer With Isotropic Magnetoresistance", Nov. 1992; pp. 931–935; Cryogenics 1993 vol. 33, No. 10.
K. Nara et al; "Possible Design for a Thin Wire Resistance Thermometer With Isotropic Magnetoresistance"; Nov. 1990; pp. 417–420; Cryogenics 1991, vol. 31.
K. Nara et al; "Magneto–resistance of a Highly Stable Industrial Grade Platinum Resistance Thermometer Between 20 and 240 K"; May 1990; pp. 16–20; Cryogenics 1991, vol. 31.

*Primary Examiner*—Richard Chilcot
*Assistant Examiner*—Paul D. Amrozowicz
*Attorney, Agent, or Firm*—Frishauf, Holtz, Goodman, Langer & Chick

[57] ABSTRACT

A temperature sensor which can achieve accurate temperature measurement in a magnetic field and accurate temperature measurement over a broader temperature range and, further, provides a temperature sensor which, in the correction of a temperature characteristic on a resistance value of the present temperature sensor, can reduce, to a minimal possible extent, an error between a value found from an approximation equation and a measured value, includes a cylindrical type sensor including a temperature-sensitive device having a micro-crystalline semiconductor thin film formed over an insulating substrate and four electrodes connected to the thin film, a cylindrical container made of a nonmagnetic metal and holding the temperature-sensitive device, together with a helium gas, hermetically sealed therein and four conductors hermetically mounted at the bottom of the container and connected to the corresponding electrodes of the temperature-sensitive device, with the micro-crystalline semiconductor thin film 2 being formed of an n-type silicon germanium and having a silicon composition ratio exceeding 50% but less than 100% and a conductivity of 0.1 to 50 S/cm.

20 Claims, 13 Drawing Sheets

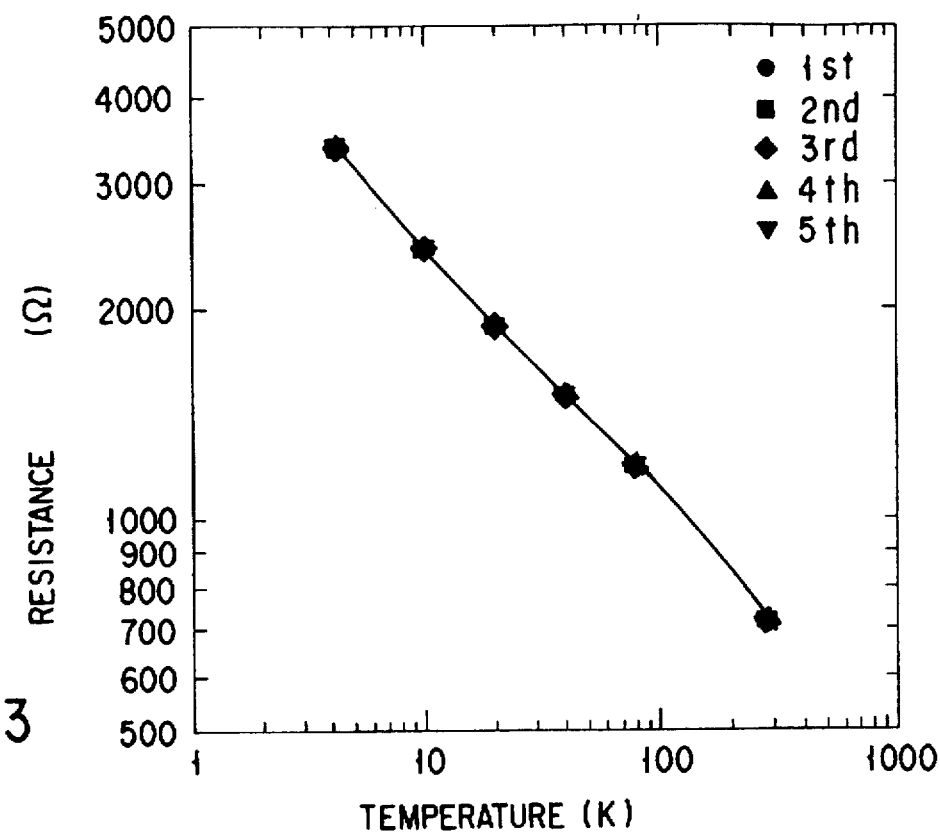
F I G. 3
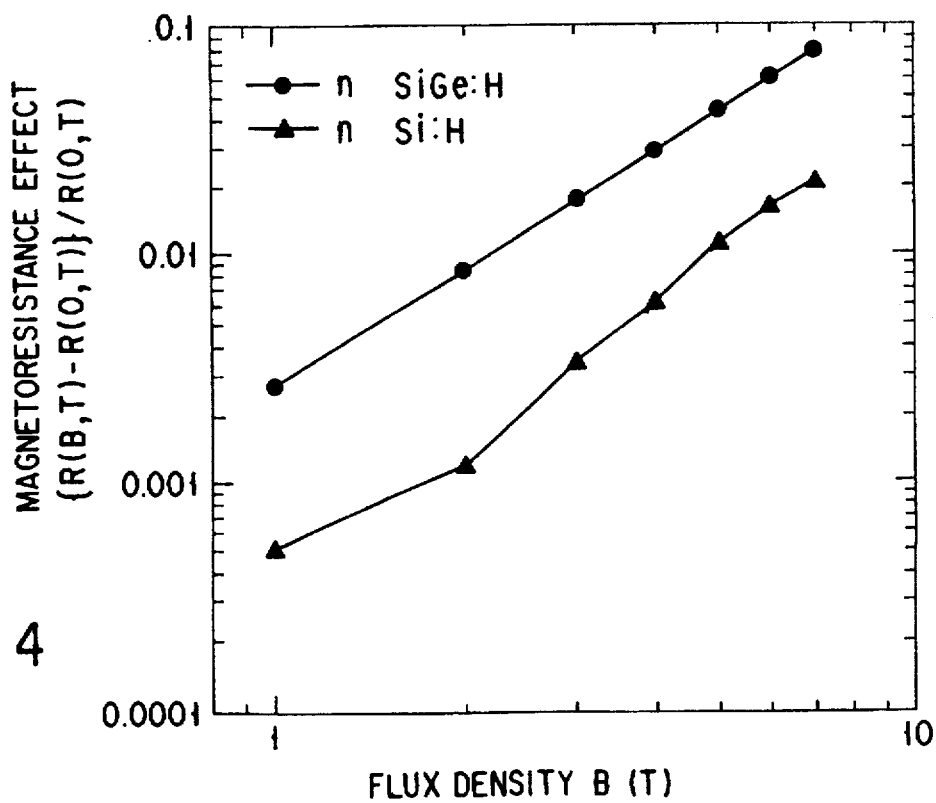
F I G. 4

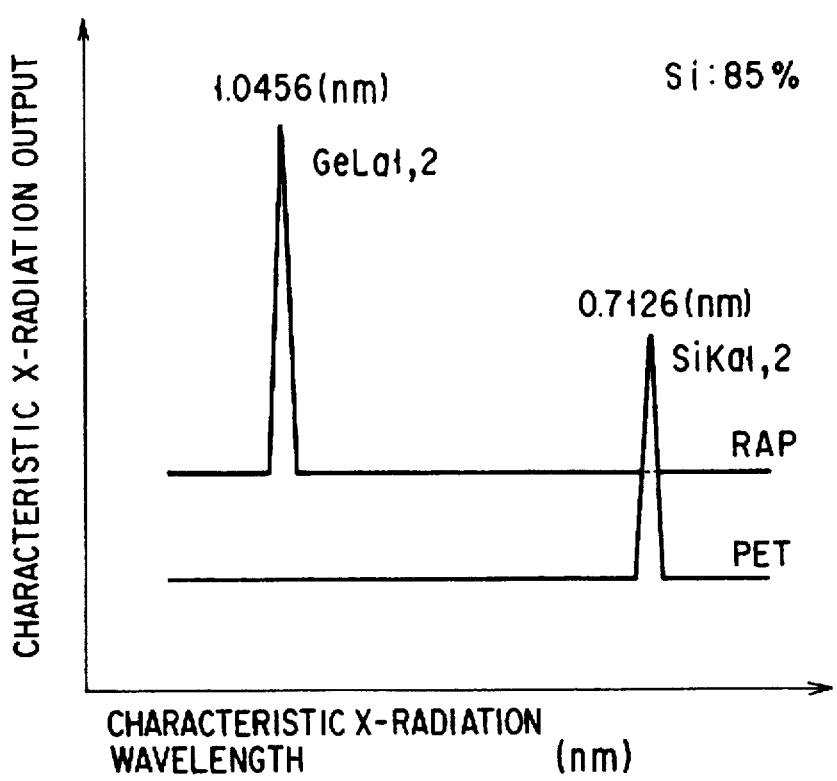
F I G. 5
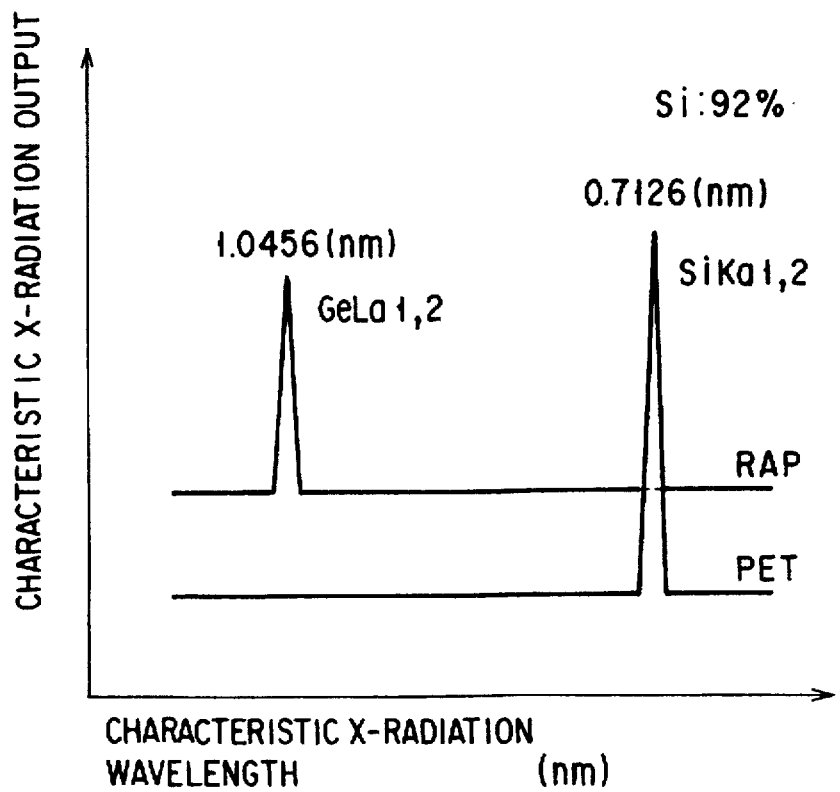
F I G. 6

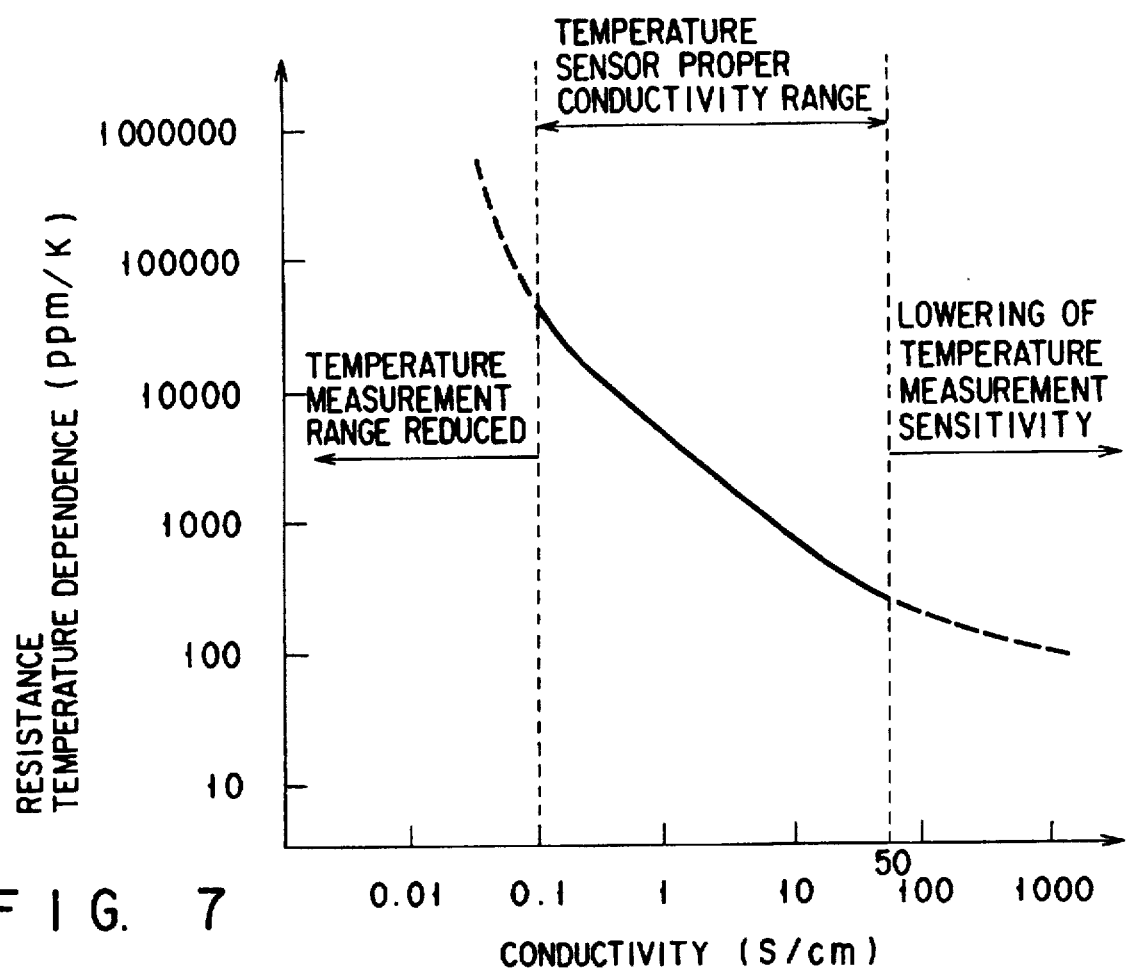

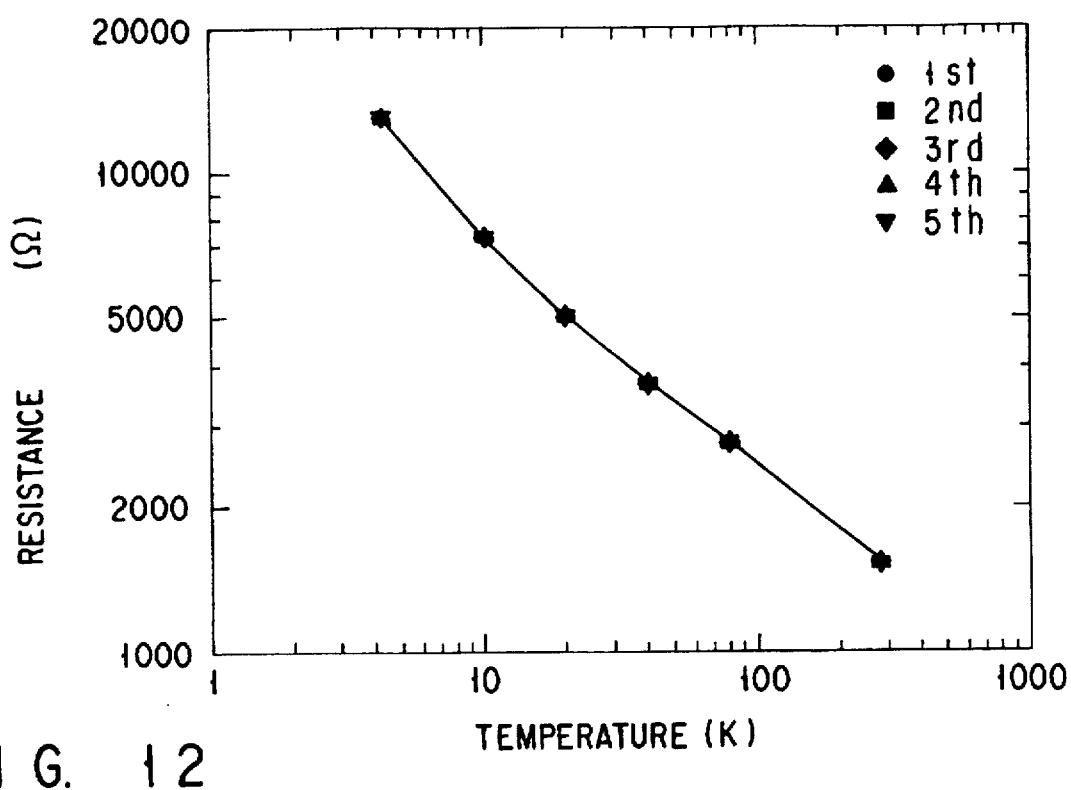
F I G. 12
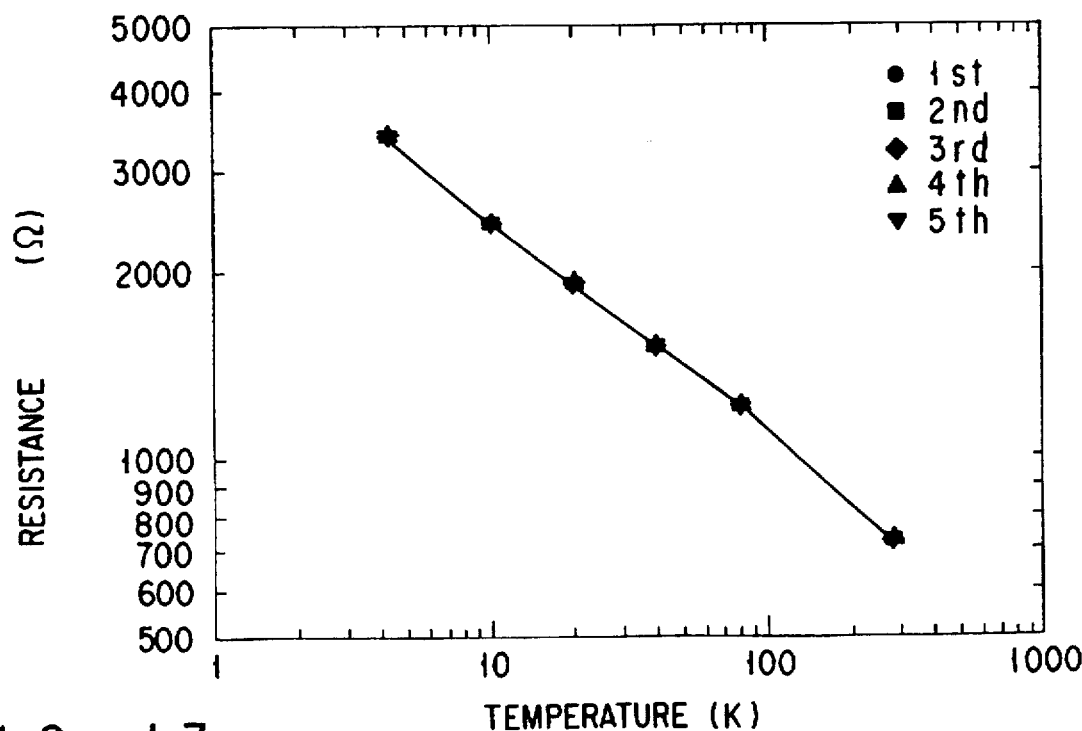
F I G. 13

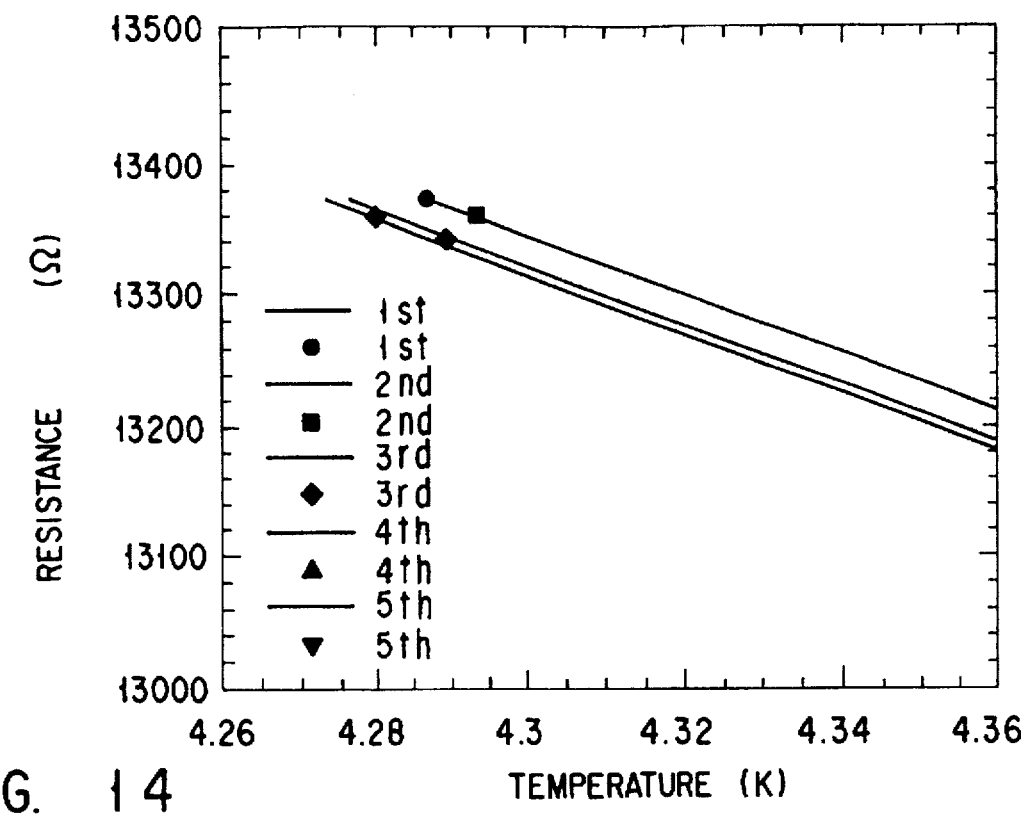
F I G. 14
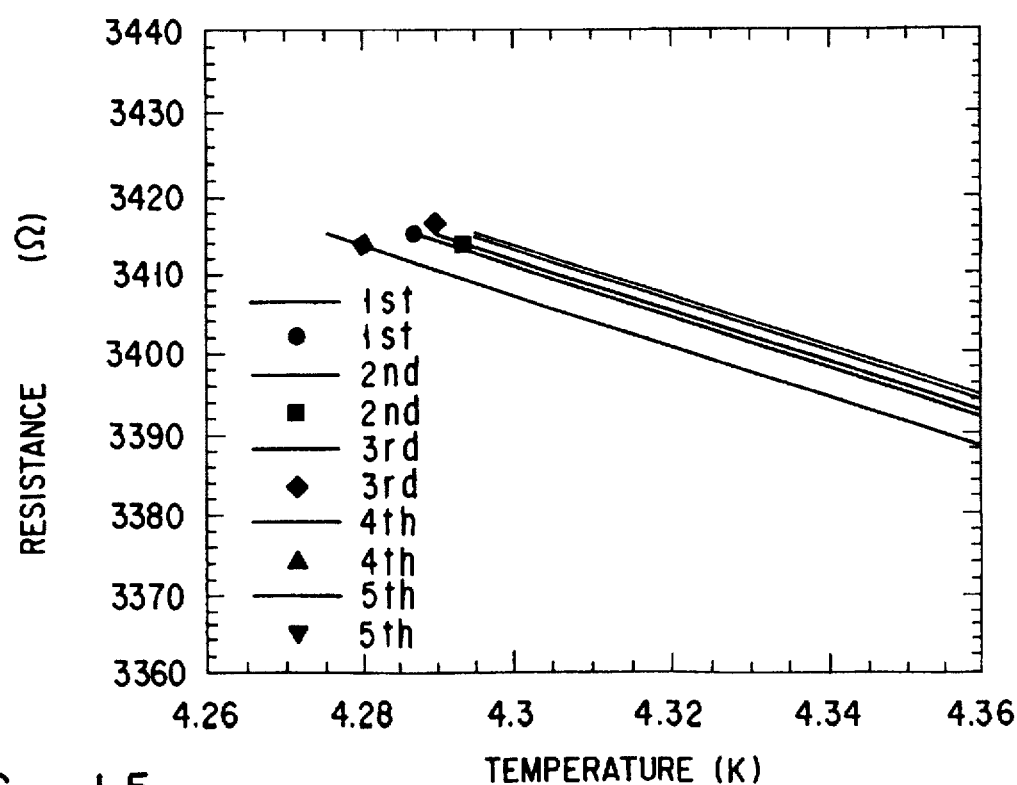
F I G. 15

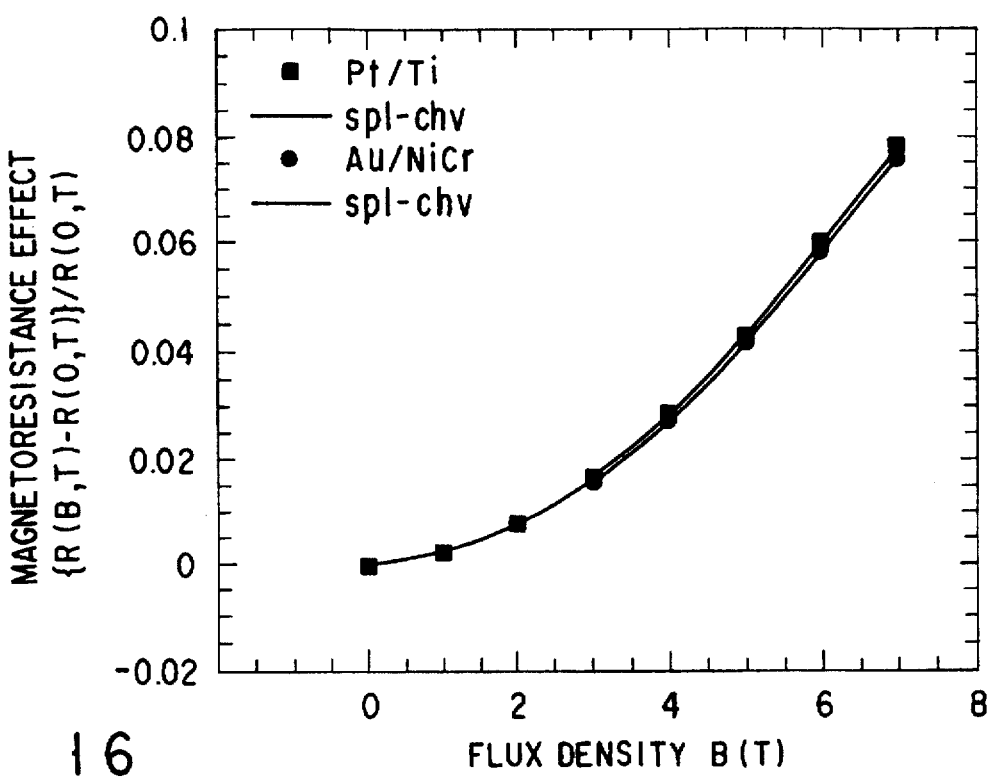
F I G. 16
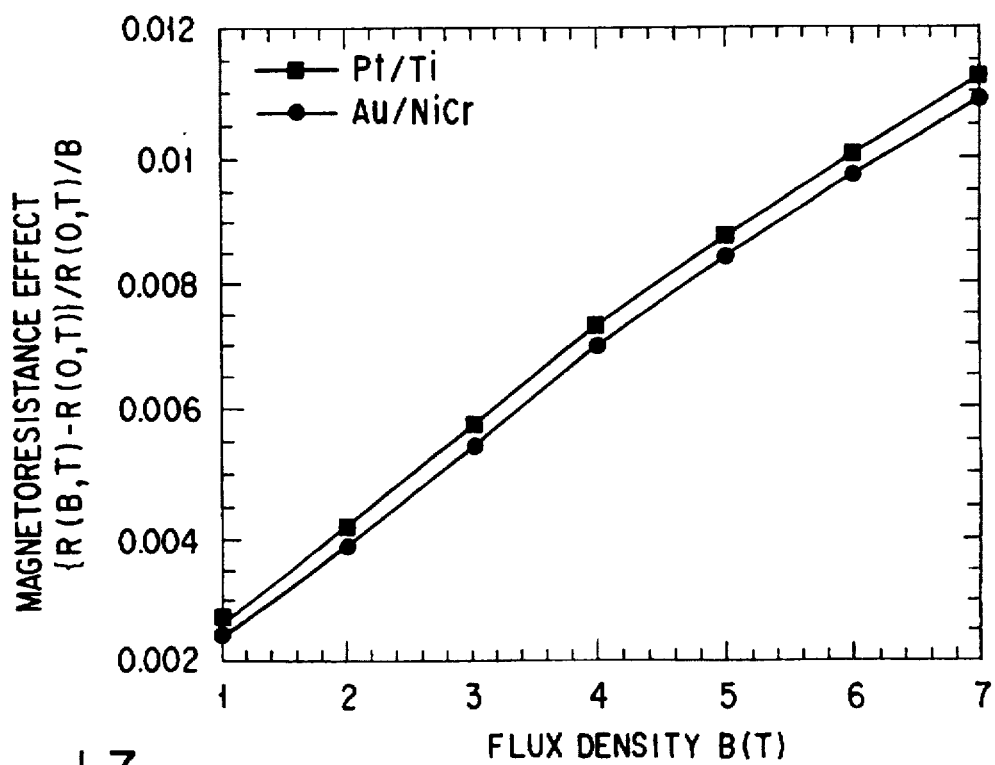
F I G. 17

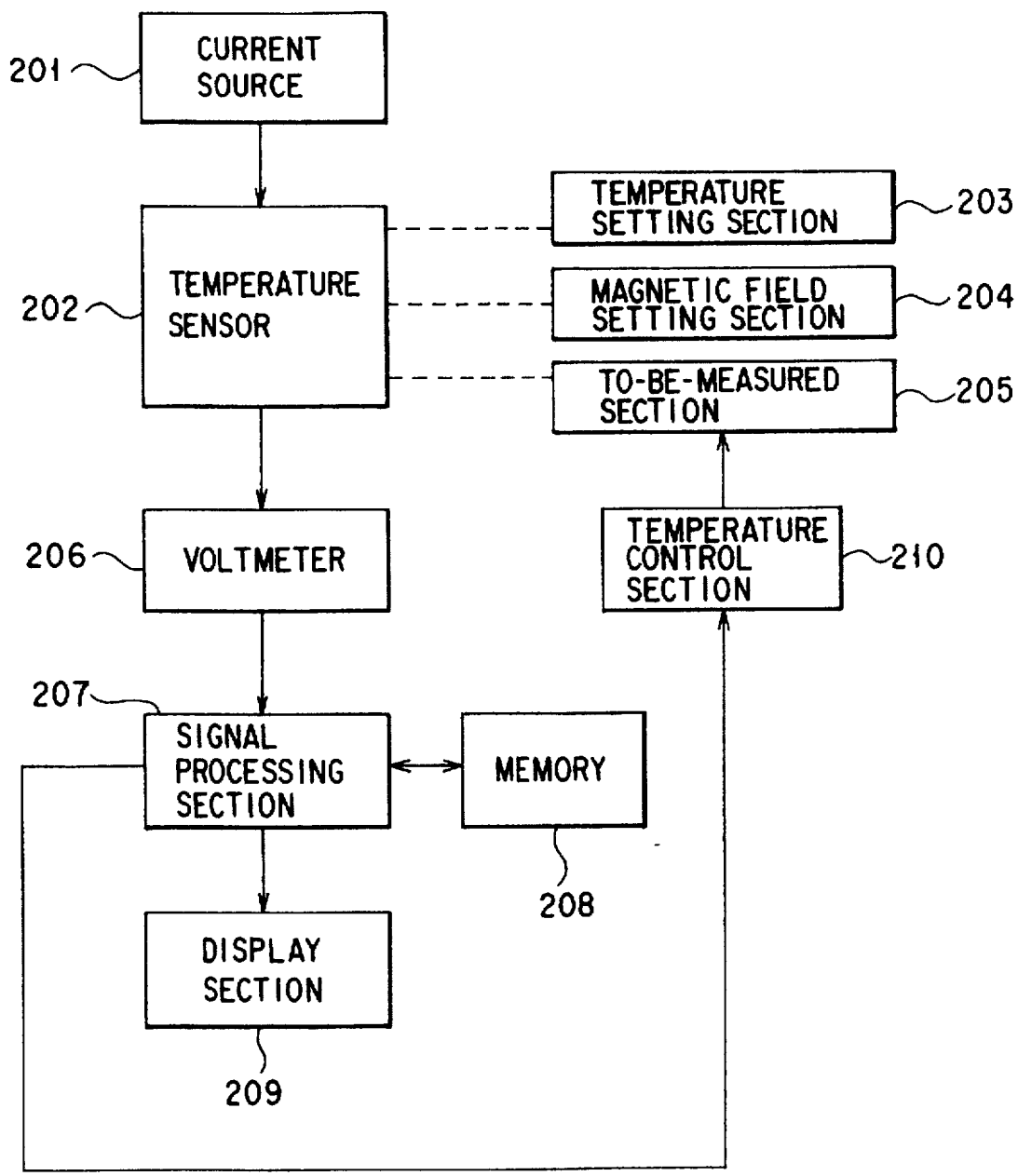
F I G. 21

TEMPERATURE SENSOR SYSTEM USING A MICRO-CRYSTALLINE SEMICONDUCTOR THIN FILM

TECHNICAL FIELD

The present invention relates generally to a temperature sensor system and, in particular, a temperature-sensitive device using a micro-crystalline semiconductor thin film, a temperature sensor and a temperature sensor system, as well as a method for deciding a temperature as an interpolation value, which establish a technique of accurately measuring a temperature ranging from room temperature to a very low temperature in a magnetic field (for example, with an accuracy of the order of milli-Kelvin) as a temperature measuring technique for use in a very low temperature (a few Kelvins, sub-Kelvin) where a superconductivity and superfluidity are observed and which can be applied to the basic measurement of the properties of material and stable excitation of a superconductive magnet and to apparatus utilizing a superconductivity, superfluidity, etc.

BACKGROUND OF ART

Conventionally, a platinum resistance thermometer, etc., have been extensively used as a practical standard in achieving accurate temperature measurement (hereinafter referred to as the temperature measurement) in a range from room temperature to a very low temperature.

These thermometers, however, have a drawback in that their resistance value varies in a magnetic field.

It has been indicated that accurate temperature measurement may be achieved under a magnetic field, by the platinum resistance thermometer, through resistance correction. However, its usable temperature range is restricted due to a residual resistance specific to that metal involved in the very low temperature and the resistance under magnetic field dependence involved greatly affects the temperature measurement in a temperature as low as below 30 Kelvin (hereinafter referred to simply as K). In actual practice, difficulty has been encountered in the correction of such a resistance.

In the temperature measurement under a magnetic field use has been made of a carbon glass resistance thermometer utilizing the temperature vs. resistance dependence of the carbon glass.

Even with the carbon glass resistance thermometer there arises an error of about 100 mK in a temperature of 4.2 K under a flux density of 8 teslas (hereinafter referred to simply as T) and, further, a greater temperature-sensitivity difference between the very low temperature and the neighborhood of room temperature.

That is, the carbon glass resistance thermometer has a specific characteristic such that it is relatively effective to the temperature measurement under a magnetic field, but that it is not suitable to the measurement in a broader temperature range.

It is much expected that a temperature sensor system be realized to achieve accurate temperature measurement both under a magnetic field and in a broader temperature range.

In order to establish the temperature measuring technique in a low-temperature magnetic field whereby it is possible to achieve both the accurate temperature measurement under a magnetic and that in a broader temperature range as set out above, the inventors of the present application have thus far directed their attention to a micro-crystalline semiconductor thin film promising as a temperature-sensitivity material and have studied it.

That is, the inventors prepared a temperature sensor device (hereinafter referred to as a temperature sensor device) using a micro-crystalline semiconductor thin film and measurements were made for the temperature vs. resistance dependence and resistance vs. magnetic field dependence.

As a result it has been confirmed that the micro-crystalline silicon germanium reveals a nearly established, predetermined temperature-resistance relation ($R=aT^b$ ...... R: a resistance, T: a temperature, a, b: arbitrary constants) in a substantially zero magnetic field over a range from a very low temperature to room temperature and is proved very promising as a temperature sensor device (see Anritsu Technical No. 67, Mar. 1994).

Further, the inventors of the present application made measurements for the resistance vs. magnetic field dependence in a low temperature range and have found that a variation of a resistance value of a micro-crystalline silicon germanium thin film under a magnetic field can be expressed with a simple function of a flux density and that, by correcting the resistance vs. magnetic field dependence as a function of the flux density, a temperature sensor using the micro-crystalline silicon germanium thin film is suited to the temperature measurement in a very low temperature under a magnetic field (see Jpn. Pat. Appln. KOKAI Publication No. 5-87641).

In the practical reduction to practice of the above-mentioned temperature sensor, however, the following things have to be considered in order to achieve highly accurate temperature measurement under the magnetic field and that in a broader temperature range simultaneously.

The first thing to be considered in this connection is to find an optimum combination of the conductivity type, properties, composition ratio, conductivity (specific conductance), etc., of the micro-crystalline semiconductor thin film used for a temperature sensor device from the standpoint of its temperature vs. resistance dependence and magnetoresistance effect.

The second thing to be considered is how to mount a temperature sensor device.

For the correction to be made in a magnetic field in accordance with the sense of the magnetic field it is required that, when the temperature sensor device is to be mounted, it be mounted in a given oriented direction in a temperature sensor (a sensor with the temperature sensor device mounted in place).

That is, when the temperature sensor is used in the magnetic field it is essentially necessary to readily recognize in which direction the temperature sensor device is oriented with respect to a magnetic field.

Further, with the temperature sensor device mounted in place, there is also a task of how it withstands a temperature cycle (room temperature→very low temperature→room temperature) and how well the measurement is reproduced.

The third thing to be considered lies in that, since the temperature vs. resistance characteristic of the temperature sensor device has no exact relation, $R=aT^b$ (R: resistance, T: temperature, a, b: arbitrary constants) as set out above, there is a problem of how its correction should be done.

That is, since, in general, the user of the temperature sensor knows a temperature from a resistance detected in a broader temperature range, he or she, even taking sample data of an actual measured value, has to take interpolation between the sample data. This interpolation operation is never easy and is cumbersome.

In actual practice, however, a coefficient to be applied to a given approximation equation is taken and a temperature is calculated from a resistance through the utilization of the coefficient.

It is thus necessary to reduce, to a minimal possible extent, an error between a value found from the approximation equation and the measured value.

The fourth thing to be considered lies in the problem of how the resistance vs. magnetic field dependence should be corrected.

DISCLOSURE OF THE INVENTION

It is accordingly the object of the present invention to provide a temperature-sensitive device, a temperature sensor and a temperature sensor system using the temperature sensor, as well as a method for deciding a temperature interpolation value, which use a micro-crystalline semiconductor thin film capable of achieving high-accurate temperature measurement under a magnetic field and high-accurate temperature measurement over a broader temperature range.

According to one aspect of the present invention there is provided a temperature sensor comprising:

a temperature-sensitive device having an insulating substrate, a micro-crystalline semiconductor thin film formed on the insulating substrate, a pair of first electrodes connected to the micro-crystalline semiconductor thin film to allow a measuring current to flow through the micro-crystalline semiconductor thin film and a pair of second electrodes connected to the micro-crystalline semiconductor thin film to detect a voltage drop induced by the measuring current in the micro-crystalline semiconductor thin film;

a cylindrical container of a nonmagnetic material with the temperature-sensitive device and helium gas hermetically sealed therein; and four conductors connected to the pair of first and second electrodes to allow currents to be carried from an outside of the cylindrical container, respectively.

According to another aspect of the present invention there is provided a temperature sensor comprising:

a temperature-sensitive device having an insulating substrate, a micro-crystalline semiconductor thin film formed on the insulating substrate, formed of an n-type silicon germanium and having a silicon composition ratio exceeding 50% but less than 100% and a conductivity of 0.1 to 50 S/cm, a pair of first electrodes connected to the micro-crystalline semiconductor thin film to allow a measuring current to flow through the micro-crystalline semiconductor thin film and a pair of second electrodes connected to the micro-crystalline semiconductor thin film to detect a voltage drop induced by the measuring current in the micro-crystalline semiconductor thin film;

a cylindrical container formed of a nonmagnetic material with the temperature-sensitive device and helium gas hermetically sealed therein; and four conductors connected to the pair of first and second electrodes to allow currents to be carried from an outside of the cylindrical container, respectively.

According to another aspect of the present invention there is provided a temperature-sensitive device comprising:

an insulating substrate;

a micro-crystalline semiconductor thin film formed over the insulating substrate and formed of n-type silicon germanium and having a silicon composition ratio exceeding 50% but less than 100% and a conductivity of 0.1 to 50 S/cm;

a pair of first electrodes connected to the micro-crystalline semiconductor thin film to allow a measuring current to flow through the micro-crystalline semiconductor thin film; and a pair of second electrodes connected to the micro-crystalline semiconductor thin film to detect a voltage drop induced by the measuring current in the micro-crystalline semiconductor thin film.

Further, according to another aspect of the present invention there are provided a temperature interpolation value deciding method for deciding a temperature in and out of a magnetic field on a temperature sensor using the above-mentioned temperature-sensitive device and a temperature sensor system.

BRIEF DESCRIPTION OF THE DRAWINGS

FIG. 3 is a temperature vs. resistance dependence of an n-type SiGe:H;

FIG. 4 is a magnetoresistance effect of an n-type SiGe:H and n-type Si:H;

FIG. 5 shows EPMA patterns of an n-type SiGe:H;

FIG. 6 shows EPMA patterns of an n-type SiGe:H;

FIG. 7 is a relation between a conductivity of an n-type SiGe and a temperature vs. resistance dependence;

FIG. 8 is a deviation table of an error on a conventional carbon glass temperature sensor and an error of an approximation by a Chebyshev's polynomial on a temperature sensor of the present invention;

FIG. 12 is a temperature vs. resistance dependence of a temperature sensor of the present invention and a reproduction;

FIG. 13 is a temperature vs. resistance dependence on a temperature sensor of the present invention and a reproducibility;

FIG. 14 is an interpolation curve found by an approximation by a Chebyshev's polynomial on the temperature sensor of the present invention;

FIG. 15 is an interpolation curve found by an approximation by a Chebyshev's polynomial on the temperature sensor of the present invention;

FIG. 16 is a resistance vs. magnetic field dependence on the temperature sensor of the present invention;

FIG. 17 is a plotted quardratic equation of a resistance vs. magnetic field on the temperature sensor of the present invention;

FIG. 21 is a block diagram of a temperature sensor system; and

BEST MODE OF CARRYING OUT THE INVENTION

First, explanation will be given of several things considered in the present invention.

According to the present invention, as described in the "Disclosure of Invention" set out above, one of microcrystalline semiconductor thin films for use in a temperature-sensitive device section is an n-type conductivity and it is formed of the material silicon germanium (SiGe) and has, a silicon composition ratio exceeding 50% but less than 100% and a limited conductivity of 0.1 to 50 S/cm.

The restriction to such a micro-crystalline semiconductor thin film is made to more clearly show the temperature-sensitive material for achieving temperature measurement in a broad range from a very low temperature to room temperature and temperature measurement capable of correcting the magnetoresistance effect under a magnetic field at a low temperature. Below is the basis upon which the restriction is made.

(1) Reasons for the Restriction Made to the n Type SiGe Body

1—1 Temperature vs. Resistance Dependence

Figure 1:
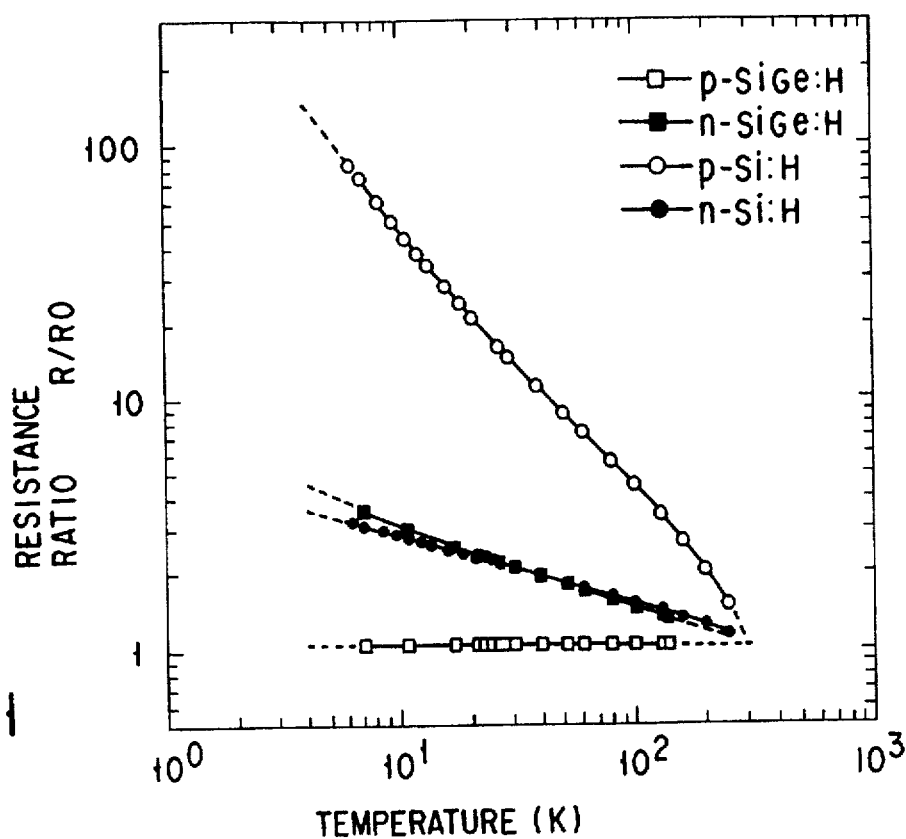
FIG. 1 is a temperature vs. resistance dependence of p- and n-type Si:H and p- and n-type SiGe:H.

Of importance to the temperature sensor is naturally a "good/bad" problem on the temperature vs. resistance dependence on the temperature-sensitive device. As shown in FIG. 1, the temperature vs. resistance dependence of the n-type SiGe body, n type Si, is substantially $R=aT^\alpha$ (R: resistance, T: temperature, a,α: arbitrary constants), a value which is good. In a P type SiGe body, however, there is no temperature sensitivity and it is not suitable for temperature measurement, while, in a P type silicon, the temperature sensitivity is too large and it is not suitable for temperature measurement over a broader temperature range.

Figure 2:
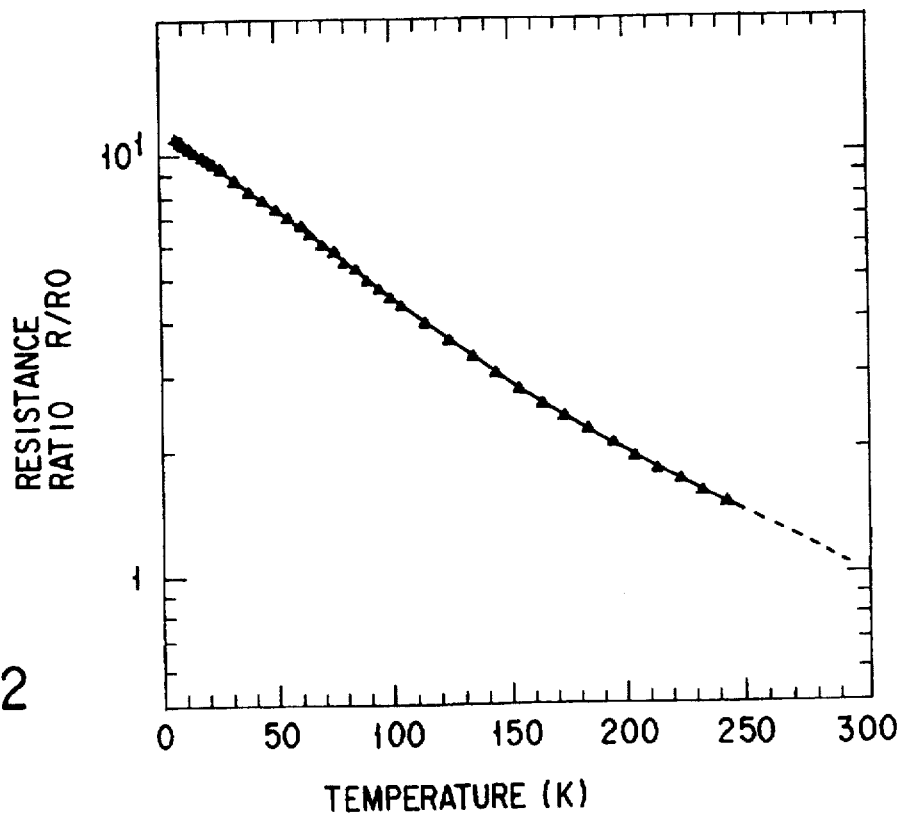
FIG. 2 is a temperature vs. resistance dependence of an n-type Ge:H.

As shown in FIG. 2, the temperature vs. resistance dependence of an n-type Ge has a relation of substantially $R=be^{\beta T}$ (R: resistance, T: temperature, b, β: arbitrary constants) and it is not possible to achieve temperature measurement with an equal degree of accuracy (%) over a temperature range from a very low temperature to room temperature.

Though being not shown, a P type Ge has no temperature sensitivity and cannot be measured in its temperature.

Thus, the n type SiGe body and n type Si are better from the standpoint of their temperature vs. resistance dependence. However, the n-type Si is not proper from the standpoint of the magnetoresistance effect as will be set out below.

FIG. 3 again shows the temperature vs. resistance dependence of the n-type SiGe body and, from the temperature vs. resistance dependence, the n-type SiGe body is very good as the temperatures sensor.

1.2 Magnetoresistance Effect

FIG. 4 shows the n-type Si of the n type SiGe body and magnetoresistance effect. The magnetoresistance effect of the n-type SiGe body has a relation of substantially $\epsilon=cB\gamma$ and, through the correction of the magnetoresistance effect, it is possible to achieve temperature measurement in a low temperature measurement in a low temperature magnetic field.

Originally, the magnetoresistance $\epsilon$ of the semiconductor is represented by a relational expression of $\epsilon=cB\gamma$ (γ is about 2, B: the flux density). As shown in FIG. 4, however, the magnetoresistance effect of the n type Si has no relation to $\epsilon=cB\gamma$ and it is difficult to correct the magnetoresistance effect of the n type Si by this relational expression.

Thus, the n type Si is not proper against the temperature-sensitive device from the magnetoresistance effect.

From this, restriction is made to the n-type SiGe as the temperature-sensitive material for achieving both the temperature measurement over the range from the very low temperature to room temperature and the temperature measurement capable of the correction of the magnetoresistance effect in a low temperature magnetic field.

(2) Reason for Restriction of the Percentage of Si in the n-Type SiGe

The excellence of the temperature vs. resistance dependence of the n type Si is as set out above.

Therefore, even for the temperature vs. resistance dependence of the n type SiGe, it is necessary to have the feature of the n-type Si, not the n-type Ge.

Briefly stated, since it is considered necessary that more Si be present than Ge, the percentage of Si in the n-type SiGe is so restricted as to exceed 50% but be less than 100%.

FIGS. 5 and 6 show a result of measurement, by an EPMA, on the percentage of Si in an n-type SiGe temperature sensor.

As shown in FIGS. 5 and 6, the percentages of Si in prepared SiGe are, respectively, 85% and 92%, in a range restricted.

It has been confirmed that the n-type SiGe of these composition ratios are suitable as a temperature sensor in a broad temperature range including the very low temperature and under a high magnetic field.

(3) Restriction of Conductivity

In the case where the n-type SiGe is used as a temperature-sensitive material for the temperature sensor, it is necessary that the conductivity be in a given proper range.

In short, too much conductivity strengthens the metallic property and falls in the temperature vs. resistance dependence, while, on the other hand, too low conductivity strengthens the semiconductor property and abnormally grows in the temperature vs. resistance dependence, thus failing to make temperature measurement in a broader temperature range.

FIG. 7 shows a conductivity distribution for the characteristic of the temperature sensor for use as the temperature-sensitive material of the n-type SiGe.

As shown in FIG. 7, the temperature sensor using the n type SiGe as the temperature-sensitivity material is such that a predetermined proper conductivity ranges from 0.1 to 50 S/cm, noting that, out of the range, the corresponding temperature-sensitive material narrows the temperature-measuring range and falls in its temperature-measuring sensitivity. From this, it is not proper as the temperature sensor.

In the present invention, as a practical form of a temperature sensor device (also called a temperature-sensitive device) use is made of a cylindrical type temperature sensor (hereinafter referred to as a cylindrical type temperature sensor) covered with a cylindrical container of a nonmagnetic metal such as aluminum.

That is because the temperature sensor device has its magnetic field correction made essential and it has to be mounted in a predetermined direction to the temperature sensor element, that is, in a predetermined direction to a reference in the temperature sensor.

As a result of measurement on the temperature vs. resistance dependence of the cylindrical type temperature sensor and its reproducibility as well as the magnetic field vs.

resistance dependence it has been confirmed that the cylindrical type temperature sensor is high in its resistance to a cooling cycle and excellent in the reproducibility of the temperature vs. resistance dependence.

Further, according to the present invention, a cubic spline interpolation is made on the temperature vs. resistance dependence of the temperature sensor device, followed by an approximation by Chebyshev's polynomials. In this case, it is possible to reduce the difference between its approximation equation and its measured value. It has been confirmed that, by doing so, the resistance temperature transformation is readily and accurately carried out.

Further, according to the present invention, it has been confirmed that even for the magnetic field vs. resistance dependence of the temperature sensor device, a resistance value variation in a magnetic field can be expressed with a simple function for the flux density and, taking the optimization of the function into consideration, a better value is obtained even against an error on the after-correction resistance value-magnetic field dependence.

Then explanation will be given of the outline of the cylindrical type temperature sensor according to the present invention (see FIG. 9).

The cylindrical type temperature sensor 1 is constructed as will be set out below.

That is, it comprises a temperature-sensitive device 3 (hereinafter referred to as a temperature sensor device 3 on the basis of the embodiment) constructed of a micro-crystalline semiconductor thin film 2 (hereinafter referred to as a micro-crystalline silicon germanium thin film 2 on the basis of the embodiment) formed of a micro-crystalline silicon germanium thin film, etc., and formed over a substrate and four electrodes connected to the thin film, a cylindrical container 4 of a nonmagnetic metal with the temperature-sensitive device, together a helium gas, hermetically sealed therein, and four conductors 5 (hereinafter referred to as Kovar connection pins 5 on the basis of the embodiment) hermetically mounted at the base of the cylindrical container 4 and respectively connected to the electrodes of the temperature-sensitive device 3.

The temperature sensor device 3 is formed by a plasma CVD method over an insulating substrate 6 (hereinafter referred to as an alumina substrate 6 on the basis of the embodiment) formed of alumina to provide the temperature-sensitive device 3.

This temperature-sensitive device 3 is comprised of a 4-electrode structure and, out of these electrodes, two electrodes provide current terminals 7 and arranged one at each end of the temperature sensor device 3.

The other two electrodes provide voltage pick-up terminals 8 arranged along the flow direction of an electric current.

In order to reduce the electric resistance of the micro-crystalline semiconductor thin film 2, the current terminals 7 are contacted at a broader area with the micro-crystalline semiconductor thin film 2.

Further, the voltage pick-up terminal 8 is contacted with the micro-crystalline silicon germanium thin film 2 at an area smaller in dimension than that of the current terminal 7.

It is to be noted that the cylindrical container 4 is made of a nonmagnetic metal, such as aluminum and copper.

Further, although the four conductors 5 connected to the electrodes of the temperature-sensitive device 3 are comprised of Kovar connection pins 5, use can be made of the nonmagnetic metal such as aluminum and copper.

Incidentally, the low or very low temperature is of such a level as to allow molecules in a gas to become a liquid and, for this reason, temperature measurement is often effected in the liquid. The direct immersion of the temperature-sensitive device 3 in the liquid leads to the destruction of the device. It is, therefore, necessary to protect the temperature-sensitive device 3 in a container.

In the cryostat, etc., it is usual practice to, for better heat conduction (for reduction of temperature measurement errors), provide a circular hole at an interface to an outside so that the container in the temperature-sensitive device 3 is made cylindrical.

The temperature-sensitive device 3 is hermetically sealed in the container 4 and a helium gas is filled therein to allow the inside to be maintained in a gas atmosphere in most operation ranges of the temperature-sensitive device.

Further, for internal and external connections, four legs are provided as the Kovar connection pins 5 at the cylindrical container 4.

The reason for the adoption of the Kovar connection pin 5 is because less heat sprain occurs due to the pressure of a temperature difference involved. It is, therefore, possible to use the nonmagnetic metal such as aluminum and copper, as already set out above.

Generally, the measurement at the very low temperature is often effected in a strong magnetic field and it is desirable not to use the magnetic material as the material of the cylindrical type temperature sensor 1.

For this reason, for example, use is made of a nonmagnetic material, such as aluminum and copper, for the cylindrical container 4.

Here, the featuring point lies in that the temperature sensor device 3 is positioned in an intimate contact relation in a manner parallel to the longitudinal direction of the two Kovar connection pins 5 on the current terminal 7 side of the four legs in the Kovar connection 5.

By doing so, the sense of the face of the temperature sensor device 3 can be known by the leg direction of the Kovar connection pin 5 and easy correction can be made according to the magnetic field vs. resistance dependence, later-described.

Then, explanation will be made of the outline of the temperature interpolation value deciding method of the temperature sensor according to the present invention.

The micro-crystalline semiconductor thin film 2 represented by the silicon germanium has a relation shown nearly equal to the (1) equation for the temperature change of the resistance over a range of room temperature to about 1.4 K. If, however, temperature measurement of the order of mK is tried in the very low temperature, it will be deviated away from the relation shown in the equation (1) in a stricter sense.

Therefore, the deviation takes on the substantially cubic curve as set out above and use is made, according to the present invention, of an interpolation by the cubic spline function.

The resistance of the cylindrical type temperature sensor 1 is measured first at a first fixed point of temperature (for example, 1.4 K) and a second fixed point of temperature (for example, 273 K).

In this case, in order to heighten the accuracy of a subsequent interpolation, several fixed points of temperature (for example, nitrogen vaporizing point, $CO_2$ gas freezing point) may be taken between the first and second fixed points of temperature.

Or a method may be adopted for taking narrower intervals between the first and second fixed points of temperature and moving the fixed points.

Based on the resistance values of the cylindrical type temperature sensor 1 at the first and second fixed points of temperature, an interpolation equation is found by the cubic spline function using, as the function of the resistance, the temperature of the cylindrical type temperature sensor 1 in a resistance range between both the resistances at the fixed points of temperature.

Further, based on the interpolation equation, an interpolation value is found for the temperature at the resistance across the two points of temperature.

Then a single Chebyshev's polynomial is found with the use of the temperature interpolation value.

According to the present invention, a broader temperature range for room temperature to the very low temperature can be covered by one Chebyshev's polynomial in place of taking the first and second fixed points of temperature.

A temperature calculation step is passed to calculate the temperature from a finally measured resistance with the use of the simple Chebyshev's polynomial.

A correction has to be taken, as a countermeasure, for the magnetic field vs. resistance dependence encountered in the magnetic field by the micro-crystalline semiconductor thin film 2 used as the temperature sensor.

Generally, since the magnetic resistance effect is nearly proportional to a product of a square of the mobility and a square of the magnetic flux, it follows that, for the micro-crystalline semiconductor thin film 2 of a small mobility, it is smaller than the metal's magnetoresistance effect even in a strong magnetic field.

Further, for the magnetoresistance effect, the parallel effect (an effect when a current and magnetic field are parallel) is very small compared with the orthogonal effect (an effect when a current and magnetic field intersect perpendicular to each other) and, here, a countermeasure against the orthogonal effect is disclosed.

Generally, if rotation is effected in two axis directions in the magnetic field, it is possible to know that the current-magnetic field relation creates an orthogonal effect producing relation (a relation of the resistance variation becoming the greatest in the magnetic field).

Even when, with the temperature set in a given state, the orthogonal effect of the magnetoresistance effect is measured as a function on the strength of the magnetic field, a curve relation of a quadratic function nearly corresponding to the strength of the magnetic field, not an orthogonal relation as will be set out below, is created and it is possible to effect the same procedure of correction as the correction for the temperature characteristic of the resistance under a zero magnetic field.

Comparison is made for the characteristics of the cylindrical type temperature sensor 1 according to the present invention and the conventional carbon glass temperature sensor as follows.

In the carbon glass temperature sensor, the maximal value error between the measured value and an equation-derived value is 5 mK while, in the cylindrical type temperature sensor 1, the maximum value error between the measured value and a value derived from the single Chebyshev's polynomial is about 9.8 mK.

Stated in more detail, the cylindrical type temperature sensor 1 of the present invention has its temperature vs. resistance dependence expressed by a relation nearly of the equation (1) and it is suited to the approximation by the Chebyshev's polynomial.

For this reason, the approximation by the single Chebyshev's polynomial can be achieved in a temperature area-nondivided way over a broader range from the very low temperature to room temperature which would otherwise encounter difficulty.

FIG. 8 shows an error of measurement by a conventional carbon glass temperature sensor and an error of the approximation by the Chebyshev's polynomials by the cylindrical type temperature sensor 1 of the present invention.

In FIG. 8, the upper area shows the order of the Chebyshev's coefficient used in the approximation by the Chebyshev's polynomials and the low area an error of the approximation at that time.

From FIG. 8 it is found that, even in any temperature regions of 1.4 K, 7 K, 30.8 K, 129.9 K and 325 K the temperature sensor of the present invention is outstandingly better.

Then, with reference to Figures, explanation will be given below about the embodiment of the present invention on the basis of the outline above.

Figure 9:
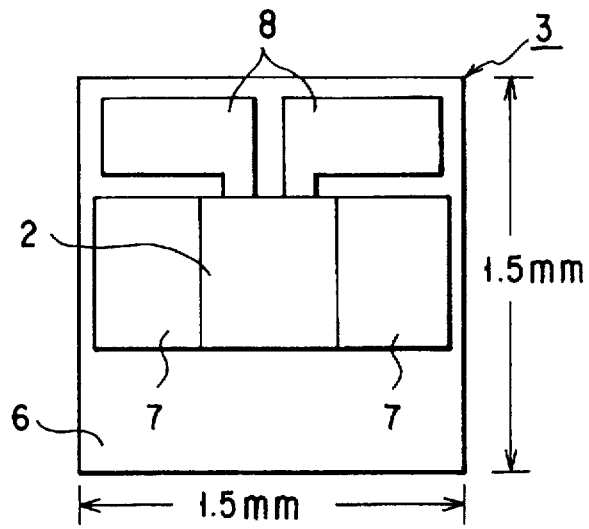
FIG. 9 is a schematic view of a temperature sensor device used in the present invention.

As shown in FIG. 9, the micro-crystalline silicon germanium thin film 2 being the micro-crystalline semiconductor thin film 2 is deposited by a plasma CVD method on the insulating substrate 6.

In this case, an $SiH_4$ and $GeH_4$ are used as a source gas and a $PH_3/H_2$ as a doping gas and an alumina substrate 6 is used as an insulating substrate 6.

After deposition the micro-crystalline silicon germanium thin film 2 on the alumina substrate 6, the temperature sensor device constituting the temperature-sensitive device 3 is fabricated.

Then explanation will be given below of a practical structure of the temperature sensor device 3.

The temperature sensor device 3 is of a 4-terminal structure such that it is possible to accurately measure the resistance of the micro-crystalline silicon germanium thin film.

A resistance element is formed by the micro-crystalline silicon germanium thin film 2 on the alumina substrate.

It is assumed that, in this case, as the practical example of the micro-crystalline silicon germanium thin film 2, the above-mentioned restriction is incorporated therein.

In order to examine an effect on the temperature sensor device by the metal electrode material at a time of cooling, a Pt/Ti or Au/NiCr is used for those electrodes of the current terminals 7 and voltage pickup terminals 8.

The micro-crystalline silicon germanium thin film 2 is about 1 μm and the temperature sensor device 3 has a size of 1.5 mm high×1.5 mm wide×150 μm thick.

It is to be noted that the resistance element has its resistance controlled at room temperature from 500 Ω to 5 KΩ by varying the deposition condition.

The resistance of the temperature sensor device 3 is found by flowing a constant current of about 1 μA across the electrodes on both the ends of the resistance element and measuring a voltage across the electrodes 8 and 8 at the central area of the resistance element.

Figure 10:
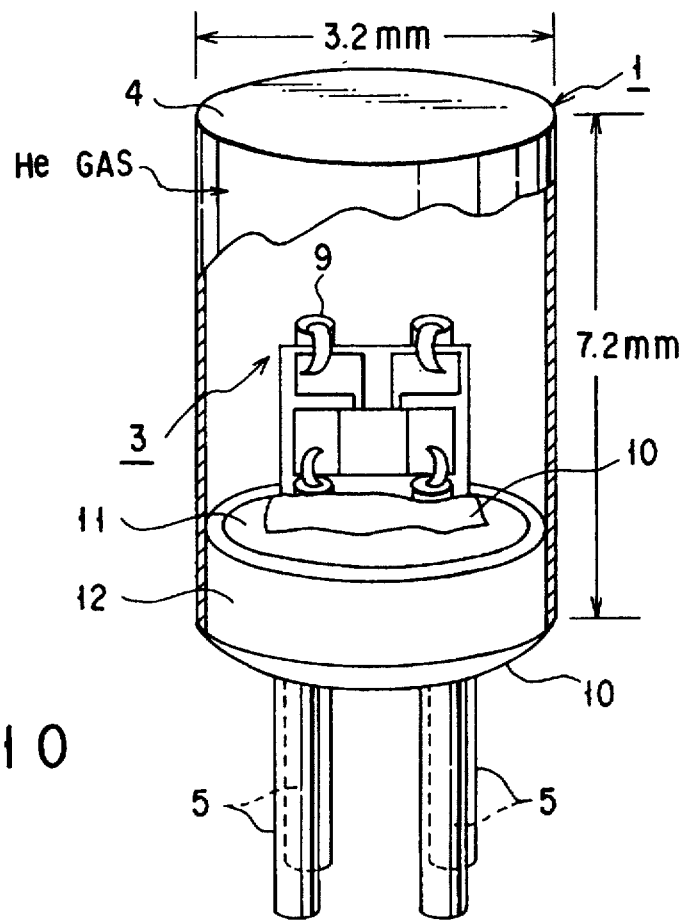
FIG. 10 is a temperature sensor of the present invention mounted.

FIG. 10 is the cylindrical type temperature sensor 1 mounted in place.

As shown in FIG. 10, this cylindrical type temperature sensor 1 is made to have a compact size of, for example, 3.2 mm in diameter×7.2 mm in length.

As set out above, the cylindrical container 4 is of such a type that, no magnetic material is used at all, taking into consideration the fact that temperature measurement is effected in a strong magnetic field.

A gold connection line is provided at the temperature sensor device 3 and 4-terminal measurement is effected through the Kovar connection lines 5.

The temperature sensor device 3 is so provided as to be arranged in a parallel, intimate contact relation to the longer legs of the Kovar connection pins 5 as seen in the longitudinal direction of the Kovar connection pins 5.

Further, the temperature sensor device 3 is hermetically sealed and fixed in place by an epoxy resin 10 of good heat conduction.

Further, the epoxy resin 10 serves as a heat sink for the temperature sensor.

The Kovar connection pin 5 is thermally and electrically insulated by glass 11 from a Kovar ring 12.

A helium gas is sealed into the cylindrical type temperature sensor 1 so as to prevent the sealed gas per se from being liquefied and solidified even in the very low temperature.

The measurement as set out below is conducted all with the use of the cylindrical type temperature sensor 1.

Figure 11:
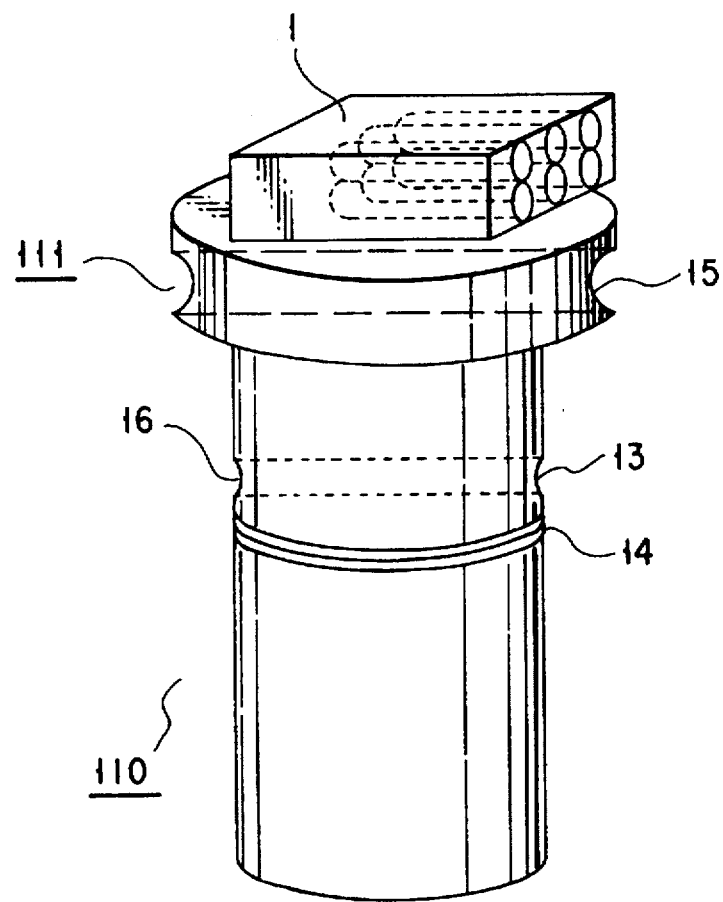
FIG. 11 is an exterior view of a cold head.

FIG. 11 is an exterior view of a cold head.

Figure 20:
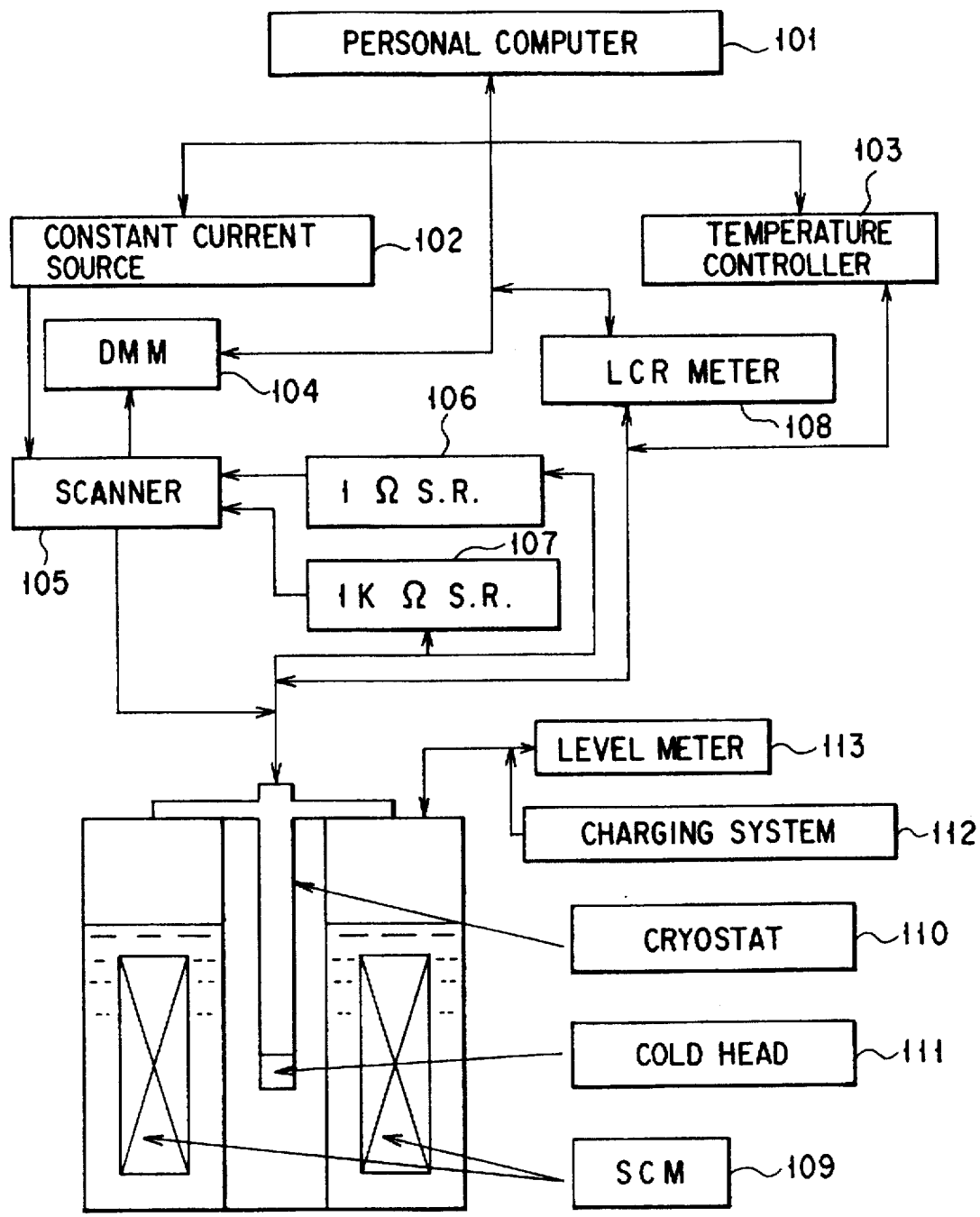
FIG. 20 is a block diagram of a measuring system.

In this case, temperature measurement is effected using six-cylinder type temperature sensor and this is so done by a temperature measuring system including a combination of the cryostat 110 and a superconducting magnet 109 (see FIG. 20).

The liquid helium is transferred to the cryostat 110 and a cold head 111 as shown in FIG. 11 is cooled to 4.2 K and, after being confirmed that this temperature is made stable, measurement is carried out.

Upon measurement at a predetermined temperature the measuring temperature of the carbon glass temperature sensor 13 is so controlled by a temperature control heater 14, that is, a heater incorporated in the cold head of the carbon glass temperature sensor 13, that the measuring temperature of the carbon glass temperature sensor 13 becomes constant.

The temperature of the cylindrical type temperature sensor 1 using the micro-crystalline silicon germanium thin film 2 at a time of stabilized temperature is measured by a rhodium iron temperature sensor 15 incorporated in the same block.

In order to achieve more accurate temperature sensor 15 in the magnetic field, use is also made of a capacitance temperature sensor 16 substantially free from an effect resulting from a magnetic field.

In the measurement of the temperature vs. resistance dependence, the resistance of the cylindrical type temperature sensor 1 is measured by the measuring system of FIG. 20 with the use of the 4-terminal method.

The electric current supplied from a constant current source 102 at the time of measurement by the 4-terminal method is used to accurately measure, by a digital multimeter (DMM) 104, output voltages from reference resistances 106, 107 (1 Ω-S.R., 1 KΩ-S.R.) placed in the thermo static bath.

In this case, in order to prevent an effect by the thermally generated emf, the electric current is supplied while alternately switching positive and negative polarities.

These measurements are all automatically performed by the measuring system shown in FIG. 20 and all the output voltages of six-cylinder type temperature sensors 1, reference resistance's output voltage for the cylindrical temperature sensor 1, output voltage of the rhodium iron temperature sensor 15, reference resistance output voltage of the rhodium iron temperature sensor 15, capacitance of the capacitance temperature sensor 16, temperature of the carbon glass temperature sensor 13, and output of the temperature control heater 14 are measured at the same time and read as data onto a personal computer 101.

At this time, amounts of heat generated at the cylinder type temperature sensor 1 and rhodium iron temperature sensor 15 are suppressed to below a few tens of n W and, by reducing the self heat generation, it is possible to enhance the accuracy with which measurement is made.

As one example of measuring points for the resistance value-temperature dependence, six points are used as 4.2 K, 10 K, 20 K, 40 K, 80 K and 300 K.

In order to evaluate the reproducibility of the temperature vs. resistance dependence, such measurement is repeated five times to allow the evaluation of the reproduction at the respective measuring points.

In the measurement of the magnetic field vs. resistance dependence, the cryostat's cold head is cooled to 4.2 K and, after the temperature has been stabilized, a superconducting magnet (SCM) 109 is excited at a temperature of 4.2 K without involving heat generation of the temperature control heater 14 and, by doing so, the resistance value at the respective magnetic flux density is measured.

At this time, after the measurement of the magnetic field vs. resistance dependence, the temperature is measured in such a state that no magnetic field is generated. By doing so, it has been confirmed that no temperature variation occurs during the measurement of the magnetic field vs. resistance dependence.

This measurement is automatically performed by the measuring system shown in FIG. 20 including the cryostat and superconducting magnet (SCM).

In this case, a normal-temperature bore type superconducting magnet (SCM) and cryostat mounted at its central area are provided and the measuring system includes the constant current source 102, voltmeter, scanner 105, temperature controller 103, capacitance LCR meter 108, charging system 112 for SCM, level meter 113, and so on.

Then explanation will be given of a result of measurement under a zero magnetic field.

Before the measurement of the temperature vs. resistance dependence of the cylindrical type temperature sensor 1 using the temperature sensor device 3 comprised of the micro-crystalline silicon germanium thin film 2 (in the same way as set out below in conjunction with the magnetic field vs. resistance dependence), a rapid cooling test is effected, as a pretest, on the cylindrical type temperature sensor 1.

The rapid cooling test is effected 100 times in a cycle of cooling down to liquid nitrogen and heating up to room temperature and examination is made for any peeling or crack on the helium gas-sealed area of the epoxy resin 10 in each cycle.

As a result it has been confirmed that neither any peeling nor crack occurs at all on the cylindrical type temperature sensor 1 under the optimal mounting state and manufacturing condition.

After the confirmation of the resistance against the liquid nitrogen temperature cooling cycle, measurement is made on the cryostat and for the temperature vs. resistance dependence under the liquid helium in the cryostat.

FIGS. 12 and 13 show the temperature vs. resistance dependence, and its reproducibility of a cylinder type temperature sensor 1 using Pt/Ti electrodes and Au/NiCr electrodes.

As evident from FIGS. 12 and 13, it has been confirmed that, in the case of the Pt/Ti electrodes and Au/NiCr electrodes, a relation nearly equal to the equation (1) is obtained for the temperature vs. resistance dependence.

That is, this is replaced by a relation shown in an equation (2):

$$(dR/dT)/(R/T)=b \qquad (2)$$

where b: a constant

In this way, for the $(dR/dT)/(R/T)$ being constant, the measuring accuracy is constant at $\delta T/T$ over a whole temperature range so that, as a result, this cylindrical type temperature sensor 1 is suited to the temperature measurement in a range from room temperature to the very low temperature.

Regarding the difference of the electrode materials, a result is obtained that, only for the case of the Pt/Ti electrodes, the slope of the temperature vs. resistance dependence is increased in the neighborhood of 4.2 K.

It may be considered that this increase is caused by the variation of the resistance value resulting from a cooling sprain caused by the Pt/Ti electrodes.

It has been confirmed that the relation of the equation (1) remains unchanged before and after mounting.

As shown in FIGS. 12 and 13, reproducibility is high as the result of five measurements and respective measuring points are plotted at the same points and, in either case, the same curves are obtained even with respect to the interpolation curves.

In FIGS. 12 and 13, the curve is shown as the interpolation curve where interpolation is effected by the cubic spline function between the measuring points and the cubic spline function is approximated by Chebyshev's polynomials.

In the approximation by the Chebyshev's polynomials, sixteen Chebyshev's coefficients of the zero-th to 15-th orders are calculated at the respective measurement of the respective cylinder type temperature sensor 1 and, based thereon, reproduction comparison is made with respect to the temperature vs. resistance dependence.

If the temperature-resistance characteristic actually measured at fixed points of temperature is smoothly interpolated, by the spline interpolation for instance, and the results are prepared as a look-up table (a numeral table), then this can be utilized for reasonable temperature measurement and, on a numeral table format, it may sometimes be necessary to perform interpolation operation on the data there.

According to the present invention, the Chebyshev's polynomials and numeral table are utilized in combination.

The following are computation equations from the cubic spline function interpolation to the approximation by the Chebyshev's polynomials.

Now let it be assumed that, at an n number of temperature measuring points as being given, the resistance is measured on the cylinder type temperature sensor 1 with an i-th and i+1-th measuring points given as first and second fixed points, respectively, of temperature.

Since the derivatives of the first- and second-orders in respective fixed points of temperature, on the plus and minus sides, in the interpolation by the cubic spline function are equal to each other, the following relation is established with T and R representing the temperature and resistance value respectively.

$$(dT/dR)_i(+)=(dT/dR)_i(-) \tag{3}$$

$$(d^2T/dR^2)_i(+)=(d^2T/dR^2)_i(-) \tag{4}$$

provided that, as the boundary condition, the second-order derivatives at both extreme ends are given zeros as follows:

$$(d^2T/dR^2)_1(+)=0 \tag{5}$$

$$(d^2T/dR^2)_n(-)=0 \tag{6}$$

The cubic spline function interpolating the i-th measuring point (the first fixed point of temperature) and i+1-th measuring point (the second fixed point of temperature) is as follows:

$$T=P/Q,$$

$$P=T_{i-1}(R_i-R)^3+e_i(R_{i-R})^2(R-R_{i-1})^3 + f_i(R_i-R)(R-R_{i-1})^2+T_i(R-R_{i-1})^3,$$

$$Q=(R_i-R_{i-1})^3 \tag{7}$$

where, $T_i$ and $R_i$ represent the temperature and resistance values at the i-th measuring point and that $e_i$ and $f_i$ represent coefficients in $$R_i < R < R_{i+1} \tag{8}$$

From the equations (3) and (7), $$S=(R_i-R_{i-1})T''_{i-1}+2(R_{i+1}-R_{i-1})T''_i+(R_{i+1}-R_i)T''_{i-1}$$

$$S/6=(T_{i+1}-T_i)/(R_{i+1}-R_i) - (T_i-T_{i-1})/(R_i-R_{i-1}) \tag{9}$$

And from the equations (4) and (7), $$e_i=2T_{i-1}+T_i-\{(R_i-R_{i-1})^2 \times (2T''_{i-1}+T''_i)/6\} \tag{10}$$

$$f_i=T_{i-1}+2T_i-\{(R_i-R_{i-1})^2 \times (T''_{i-1}+2T''_i)/6\} \tag{11}$$

From the equations (5), (6) and (9), $(d^2T/dR^2)_i$ (i=1, 2, ..., n) is found and, by substituting this into the equations (10) and (11), $e_i$ and $f_i$ are found. Substituting these into the equation (7) gives the cubic spline function interpolating the i-th measuring point (the first fixed point of temperature) and i+1-th measuring point (the second fixed point of temperature).

Through the use of the interpolation by the cubic spline function thus obtained, sampling points are calculated and the approximation by the Chebyshev's polynomials is carried out. The Chebyshev's coefficient $C_i$ used in the approximation by the Chebyshev's polynomials is found by the following equation.

$$C_1 = \frac{1}{n} \sum_{j=1}^{n} A_1(x_j)T(R_j), \tag{12}$$

$$C_i = \frac{2}{n} \sum_{j=1}^{n} A_1(x_j)T(R_j)$$

$$(i = 2, 3, \ldots),$$

where, $A_i$ represents an orthogonal polynomial (see the equations (19) to (26)).

With $R_u$ and $R_L$ representing the maximal value and minimal value in a range of the approximation by the Chebyshev's polynomials, $$x_j=\cos((2j-1)\pi/2n) \ (j=1, 2, \ldots, n) \tag{13}$$

$$R_j=\{(1+x_j)R_u+(1-x_j)R_L\}/2 \tag{14}$$

Here, as shown in the equation (12), the Chebyshev's polynomial is found by selecting the interpolation values found by the cubic spline function and calculating the sum of products of the obtained sampling points times the orthogonal polynomial.

The Chebyshev's polynomial is shown below.

$$T= \sum_{i=0}^{n} C_i A_i(x) \tag{15}$$

$$A_i(x) = \cos(i\cos^{-1}(x)) \tag{16}$$

$$A_i(x) = 2xA_{i-1}(x) - A_{i-2}(x) \tag{17}$$

$$x = \{(R-R_L) - (R_u - R)\}/(R_u - R_L) \tag{18}$$

The orthogonal polynomial $A_i(x)$ is found below by expanding the equation (17).

$$A_{15}(x) = 16384x^{15} - 61440x^{13} + \quad (26)$$
$$92160x^{11} - 70400x^9 +$$
$$28800x^7 - 6048x^5 +$$
$$560x^3 - 15x$$

The approximation using the Chebyshev's polynomial is carried out by, from the interpolation by the cubic spline function, selecting specific sampling points and effecting the above-mentioned predetermined calculations.

By applying the approximation by the Chebyshev's polynomial to the temperature vs. resistance dependence as set out above it is possible to accurately and easily effect a resistance/convert temperature conversion on the cylinder type temperature sensor 1.

For this reason, the result of the approximation by the Chebyshev's polynomial can be used to evaluate the reproducibility of the temperature vs. resistance dependence and is effective to achieve actual temperature measurements on the cylinder type sensor 1.

FIGS. 14 and 15 show the reproducibility of the resistance at 4.2 K on the cylinder type temperature sensor 1 using the Pt/Ti and Au/NiCr.

In FIGS. 14 and 15, the solid lines show interpolation curves found by the approximation by the Chebyshev's polynomial also shown in FIGS. 12 and 13.

As shown in FIGS. 14 and 15, the reproducibility achieved after a result of five measurements is in a range of +10 mK at 4.2 K, an accuracy nearly the same as that at the temperature measurement of the rhodium iron temperature sensor 15 measuring the temperature of the cylindrical type temperature sensor 1.

A result of measurements in a magnetic field is shown below.

This is a result of measurements on the magnetic field vs. resistance dependence after it has been confirmed that, as set out above, the reproducibility on the temperature vs. resistance dependence of the cylindrical type temperature sensor 1 is high.

FIG. 16 shows a magnetic field vs. resistance dependence of the Pt/Ti and Au/NiCr electrode-equipped cylinder type temperature sensor 1 under a magnetic field at a flux density 0T to 7T measured at 4.2 K.

As appreciated from FIG. 16, the resistance value of the cylinder type temperature sensor 1 varies in a smooth curve due to the excitation of the magnetic field and there is a tendency such that the resistance value increases with an increase in flux density.

In FIG. 16, as in the case of the temperature vs. resistance dependence, an interpolation curve is shown where, through the interpolation by the cubic spline function between the measuring points, this cubic spline function is approximated by the Chebyshev's polynomial.

Even in this case, 16 Chebyshev's coefficients of the zero-th to 15-th order are calculated.

By this interpolation the variation of the resistance under the magnetic field is corrected and, by doing so, a true temperature in the very low temperature/high magnetic field is precisely measured.

FIG. 17 shows a plotted quadratic equation for the magnetic field vs. resistance dependence, the abscissa denoting the flux density and the ordinate a ratio, to the flux density, of a variation proportion (ratio) $\epsilon$ of the resistance value in a magnetic field as expressed below.

$$\epsilon = \{(R(B,T) - R(0,T))/R(O,T) \quad (27)$$

In the case where, in FIG. 17, the magnetic field vs. resistance dependence is expressed by a straight line, the variation proportion $\epsilon$ is expressed by the quadratic equation of the flux density like this:

$$\epsilon = aB^2 + bB + C \quad (28)$$

(B: magnetic flux density, a, b, c: arbitrary constants)

And the increment of the resistance value can be corrected.

If, as shown in FIG. 17, correction is made with the use of the quadratic equation, there occurs a greater deviation from the correction equation in a high flux density area and, as a result of an approximation based on the interpolation equation by least squares, an after-correction error of measurement is about ±9 mK in terms of its corresponding temperature.

Now explanation will be given below of the correction method for reducing the corrected error of measurement.

That is, according to the present invention, even in the correction of the quadratic equation shown in the equation (28) attention is paid to the first order term being hardly conducive to the correction and, based thereon, a correction method using the flux density expressed with a power has been tried as in the case where the variation proportion $\epsilon$ is $$\epsilon = aB^b \quad (29)$$

(a, b: arbitrary constants).

Figure 18:
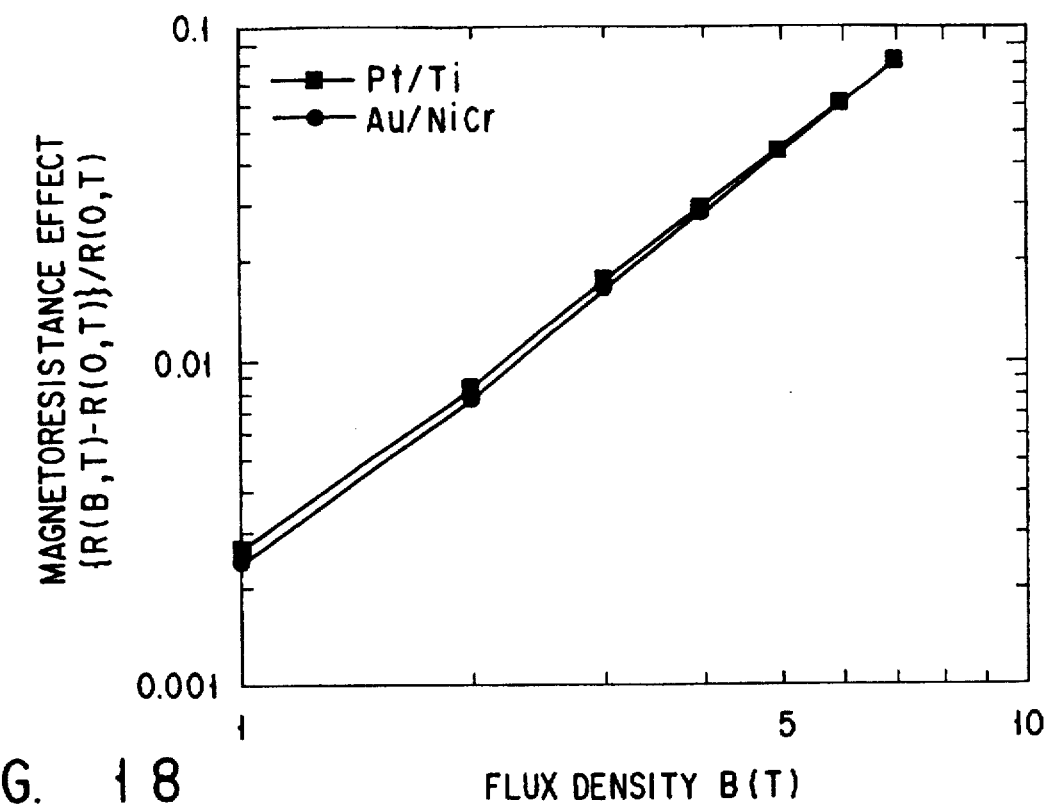
FIG. 18 is a log-log plot of a resistance vs. magnetic field dependence on the temperature sensor of the present invention.

FIG. 18 shows a log-log plot of the magnetic field vs. resistance dependence.

As seen from FIG. 18, the magnetic field vs. resistance dependence is almost linearly expressed and it has been confirmed that this is a better approximation method.

Further, the slope in FIG. 18 is about 1.8 on the cylinder type temperature sensor 1 having the Pt/Ti and Au/NiCr electrodes and the result obtained is that the variation proportion $\epsilon$ is in proportion to a 1.8 power of the flux density.

Figure 19:
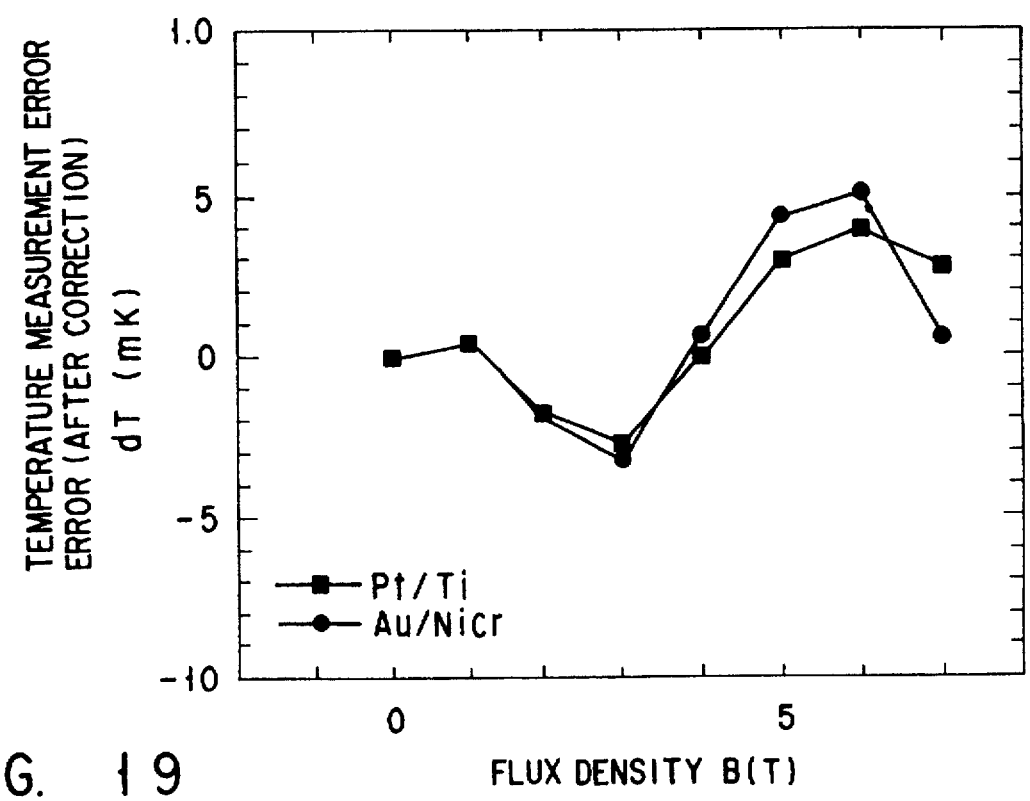
FIG. 19 is a correction error in terms of its temperature which is obtained by approximating a result of measurement of FIG. 18 by a law of least squares.

FIG. 19 shows a corrected error obtained as a result of the approximation based on an equation of interpolation by the least squares as a result of measurement in FIG. 18, that is, an error expressed in terms of a corresponding interpolation.

As shown in FIG. 19, the corrected result is better and the temperature measurement error after correction, being expressed in terms of a corresponding temperature, is ±4 mK for the Pt/Ti electrode and ±5 Km for the Au/NiCr electrode, these values being decreased in comparison with the error after correction by the quadratic equation.

As the result of measurement, the amount of correction of the resistance caused by the magnetic field is substantially the same both in the Pt/Ti and Au/NiCr electrodes and, since in the cylinder type temperature sensor 1 having the Pt/Ti electrodes the slope of the temperature vs. resistance dependence in the neighborhood of 4.2 K increases, the corrected temperature error is obtained as a small value compared with the case of the Au/NiCr electrodes.

According to the present invention the method for achieving temperature correction with high precision is studied and it has been confirmed that the method by which, in addition to the interpolation by the cubic spline function as shown in FIG. 16 the approximation is also effected by the Chebyshev's polynomial is effective.

That is, this correction method comprises, as shown in FIG. 16, effecting, at 4.2 K, interpolation by the cubic spline function and approximation by the Chebyshev's polynomial.

In order to realize the approximation by the Chebyshev's polynomial in all temperature ranges with respect to the magnetic field vs. resistance it is only necessary to find the temperature dependence of the Chebyshev's coefficients per se.

By finding such temperature dependence the interpolation is made by the cubic spline function between the measuring data and the magnetic field correction is precisely approximated by the Chebyshev's polynomial. By doing so it is possible to very much improve the correction accuracy in all temperature range.

It is of course possible, even in this case, to utilize a measuring method utilizing a numeral table, as in the zero magnetic field, prepared through the interpolation made by the spline function.

According to the present invention, as set out above, the mounting method of the temperature sensor using the micro-crystalline silicon germanium thin film 2 is under study and the cylinder type temperature sensor 1 thus manufactured based thereon uses the cylindrical container 4 made of the nonmagnetic material, such as aluminum and copper, and is made compact to a size of 3.2 mm in diameter×7.2 mm in length with a helium gas sealed therein.

This cylindrical temperature sensor 1 was rapidly cooled 100 times under the liquid nitrogen and it has been confirmed that there occurs neither a peeling nor a crack.

The cylindrical type temperature sensor 1 is measured for its temperature vs. resistance dependence and reproducibility at six points of temperature (4.2 K, 10 K, 20 K, 40 K, 80 K and 300 K) and, as a result of measurement, the temperature vs. resistance dependence substantially satisfies the equations (1) and (2).

FIG. 21 is a diagram of a temperature sensor according to the present invention as set out above.

That is, a temperature sensor 202 corresponding to the above-mentioned cylinder type temperature sensor 1 receives a predetermined current from a current source 201 and is provided in connection with a temperature setting section 203 for setting the above-mentioned first and second fixed points of temperature, a magnetic field setting section 204 for setting first and second magnetic fluxes and a to-be-measured section 205.

A voltmeter 206 measures a voltage from the temperature sensor 202 and outputs it to a signal processing section 207.

The signal processing section 207 calculates a resistance of the temperature sensor 202 on the basis of the voltage from the voltmeter 206 and, based on the resistance, performs predetermined calculation processing to determine the temperature interpolation value of the temperature sensor 202.

A memory 208 stores a temperature interpolation value decided by the signal processing section 207.

Thereafter, when temperature measurement is performed at the to-be-measured section 205, the signal processing section 207 performs the resistance calculation as set out above and, reading out the temperature interpolation value from the memory 208, performs predetermined interpolation. By doing so, the actual temperature is calculated for display on a display section 209.

A temperature control section 210 is comprised of a heater, a trap for cooling, etc., and, when temperature control is required, controls the temperature at the to-be-measured section 205 on the basis of an output from the signal processing section 207.

Figure 22:
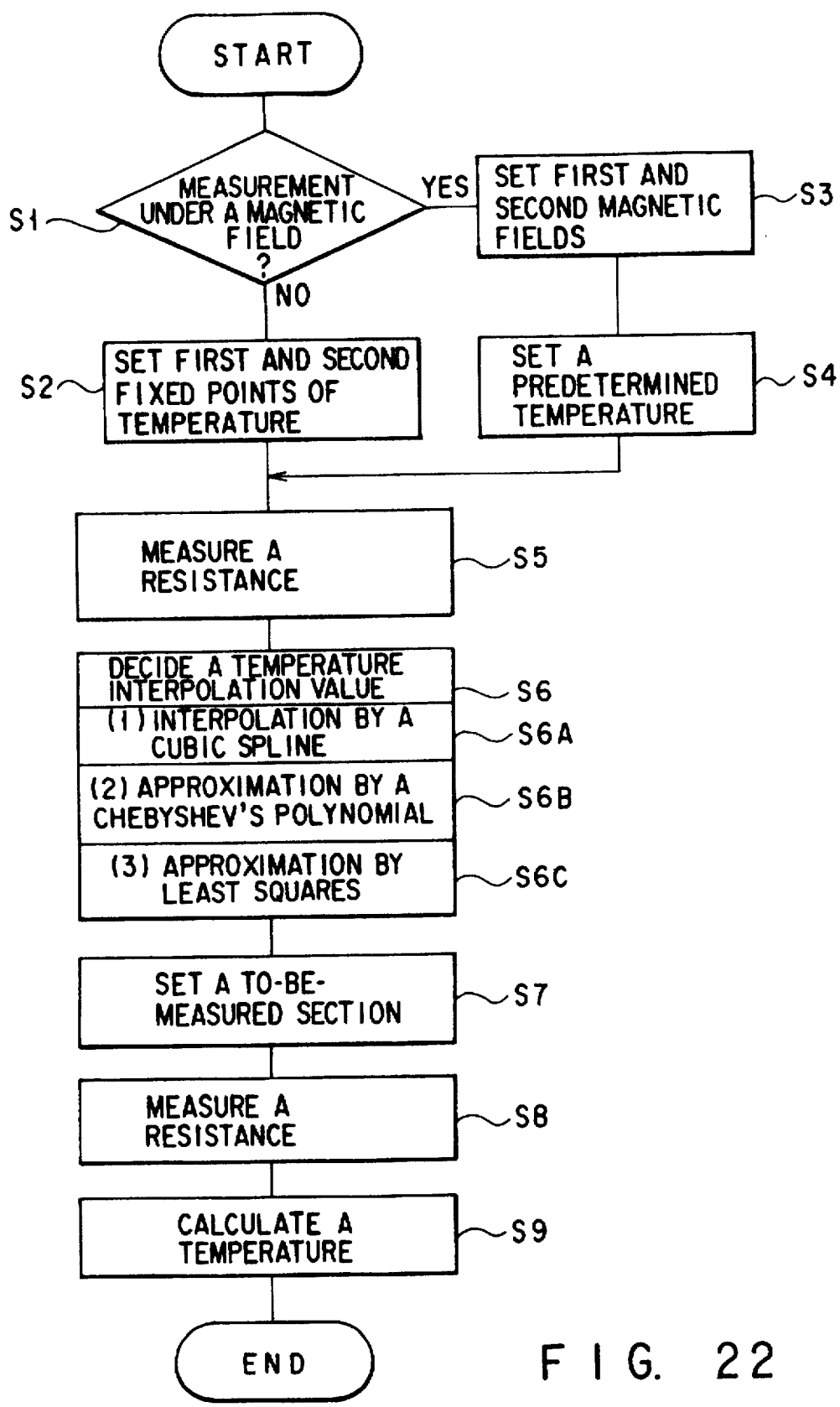
FIG. 22 is a flow chart of the system of FIG. 21.

FIG. 22 is a flow chart of operations performed on the temperature-sensor system shown in FIG. 21.

That is, it is decided at step S1, whether or not temperature measurement is made under a magnetic field.

If the result of decision at step S1 is in the negative, control is advanced to step S2 and first and second fixed points of temperature are sequentially set for the above-mentioned temperature vs. resistance dependence measurement.

If the result of decision at step S1 is in the positive, the above-mentioned first and second magnetic fluxes (including the decision of the magnetic field direction) are sequentially set at step S3 and control is advanced to step S4 where predetermined temperatures are set for the magnetic field vs. resistance dependence measurement.

In either measurement, the resistance value measurement is effected by the temperature sensor 202 at step S5 and then step S6 determines the temperature interpolation value of the above-mentioned temperature sensor 202.

The decision of step S6 includes the above-mentioned (1) interpolation by the cubic spline function S6A, (2) approximation by the Chebyshev's polynomial S6A and (3) approximation by least squares S6C and it performs these operations either singly (1) or in combination with (2) and (3).

After the temperature interpolation values are thus determined, the temperature sensor 202 is set at the to-be-measured section 205 at step S7.

The resistance values measured at step S8 are interpolated by step S9 on the basis of the temperature interpolation values determined at step S6 and, after the actual temperature of the to-be-measured section 205 is calculated, a requisite temperature display and temperature control are done.

As set out in detail above, according to the temperature sensor utilizing the micro-crystalline semiconductor thin film in accordance with the present invention it is possible to achieve both high-accurate temperature measurement in the magnetic field and high-accurate temperature measurement in a broader range of temperature.

In a practical mount form of the temperature sensor device used in the present invention, it is mounted in a predetermined direction to a reference in the cylindrical type temperature sensor and it is possible to externally and readily recognize in which direction relative to the magnetic field direction the temperature sensor device is oriented and to readily make correction in the magnetic field in accordance with the sense of the magnetic field.

It has been confirmed that the cylindrical type temperature sensor according to the present invention reveals high resistance to the cooling cycle and excellent reproducibility in the temperature vs. resistance dependence.

With respect to the temperature vs. resistance dependence the cylindrical type temperature sensor according to the present invention can reduce an error between an approximation equation, that is, an equation obtained using an approximation-by-Chebyshev's-polynomial method, and a measured value. By doing so it is possible to accurately and readily convert resistance value/temperature conversion.

Regarding the magnetic field vs. resistance dependence also, the cylindrical type temperature sensor according to the present invention enables a variation of the resistance in the magnetic field to be expressed by a simple function of the magnetic flux density. By optimizing this function it is possible to reduce a corrected error of the magnetic field vs. resistance dependence to a very small value.

According to the temperature sensor using the micro-crystalline semiconductor thin film, it is thus possible to achieve temperature measurement in a broader temperature range in a magnetic field which would otherwise encounter difficulty in the conventional carbon glass temperature sensor and to, through the correction of the magnetic field vs. resistance dependence, achieve ±5 mK, an error far improved in comparison with a temperature measurement error of 100 mK in a magnetic field of a carbon glass resistance thermometer.

Further, the temperature sensor of the present invention has its temperature vs. resistance dependence made constant in $(dR/R/T)/(R/T)$ and, since the temperature measurement accuracy is constant in $\delta T/T$ over a whole temperature range, is suited to achieving temperature measurement in a range from room temperature to a very low temperature.

That is, according to the present invention a very low temperature/high magnetic field-applicable high-precision temperature sensor can be put to practical use as one sensor measurable in a range from room temperature to a very low temperature, this relation remaining unchanged before and after its practical mount.

Further, according to the temperature sensor of the present invention, the reproducibility at five measurements is high and the error is in a range of below ±10 mK at a temperature of 4.2 K, an accuracy which has being proved substantially equal to that of the temperature measurement by the rhodium iron temperature sensor.

Further, according to the temperature sensor of the present invention, the value magnetic field vs. resistance dependence is also such that, at 4.2 K and 7 T, it has a relation substantially satisfying the equations (28) and (29). The temperature measuring error after correction is ±4 mk for the equation (28) and ±9 mK for the equation (29).

We claim:

1. A temperature sensor comprising:
   a temperature-sensitive device having an insulating substrate, a micro-crystalline semiconductor thin film formed on the insulating substrate, a pair of first electrodes connected to the micro-crystalline semiconductor thin film to allow a measuring current to flow through the micro-crystalline semiconductor thin film and a pair of second electrodes connected to the micro-crystalline semiconductor thin film to detect a voltage drop induced by the measuring current in the micro-crystalline semiconductor thin film;
   a cylindrical container of a nonmagnetic material with the temperature-sensitive device and helium gas hermetically sealed therein; and
   four conductors connected to the pair of first and second electrodes to allow currents to be carried from an outside of the cylindrical container, respectively, the temperature-sensitive device being closely arranged in a direction parallel to a longitudinal direction of the two of the four conductors which are connected to the pair of first electrodes, whereby the temperature-sensitive device held in the cylindrical container of a nonmagnetic material has an oriented direction thereof visibly confirmed from an outside to allow the temperature sensor to be set such that the temperature-sensitive device is oriented in a predetermined direction in a magnetic field.

2. A temperature sensor comprising:
   a temperature-sensitive device having an insulating substrate, a micro-crystalline semiconductor thin film formed on the insulating substrate, formed of an n-type silicon germanium and having a silicon composition ratio exceeding 50% but less than 100% and a conductivity of 0.1 to 50 S/cm, a pair of first electrodes connected to the micro-crystalline semiconductor thin film to allow a measuring current to flow through the micro-crystalline semiconductor thin film and a pair of second electrodes connected to the micro-crystalline semiconductor thin film to detect a voltage drop induced by the measuring current in the micro-crystalline semiconductor thin film;
   a cylindrical container formed of a nonmagnetic material with the temperature-sensitive device and helium gas hermetically sealed therein; and
   four conductors connected to the pair of first and second electrodes to allow currents to be carried from an outside of the cylindrical container, respectively, the temperature-sensitive device being closely arranged in a direction parallel to a longitudinal direction of those two of the four conductors which are connected to the pair of first electrodes, whereby the temperature-sensitive device held in the cylindrical container of a nonmagnetic material has an oriented direction thereof visibly confirmed from an outside to allow the temperature sensor to be set such that the temperature-sensitive device is oriented in a predetermined direction in a magnetic field.

3. A method for deciding temperature interpolation values of a resistance-temperature sensor using a micro-crystalline semiconductor thin film, comprising the steps of:
   a) measuring resistances on the resistance-temperature sensor at first and second fixed points of temperature; and
   b) calculating, based on the resistances at the first and second fixed points of temperature, an interpolation equation by a cubic spline function taking a logarithm of a temperature on the resistance-temperature sensor between both the first and second fixed points of temperature as a function of a logarithm of a resistance, the first fixed point of the temperature being 1.4K and the second fixed point of temperature being 273K.

4. A method for deciding temperature interpolation values of a resistance-temperature sensor using a micro-crystalline semiconductor thin film being formed of an n-type silicon geranium and having a silicon composition ratio exceeding 50% but less than 100% and a conductivity of 0.1 to 50 S/cm, comprising the steps of:
   a) measuring resistances on the resistance-temperature sensor at first and second fixed points of temperature; and
   b) calculating, based on the resistances at the first and second fixed points of temperature, an interpolation equation by a cubic spline function taking a logarithm of a temperature on the resistance-temperature sensor between both the first and second fixed points of temperature as a function of a logarithm of a resistance, the first fixed point of the temperature being 1.4K and the second fixed point of temperature being 273K.

5. A method for deciding temperature interpolation values of a resistance-temperature sensor with the use of a micro-crystalline semiconductor thin film, comprising the steps of:
   a) measuring resistance on the resistance-temperature sensor at first and second fixed points of temperature;
   b) calculating, based on the first and second fixed points of temperature, an interpolation equation by a cubic spline function taking a logarithm of a temperature on the resistance-temperature sensor between both the first and second fixed points of temperature as a function of a logarithm of a resistance.
   c) calculating interpolation values of a temperature corresponding to the resistance between both the first and second fixed points of temperature according to the interpolation equation; and
   d) calculating a single Chebyshev's polynomial using the interpolation value found at the step (c).

6. A method for deciding temperature interpolation values of a resistance-temperature sensor using a micro-crystalline semiconductor thin film being formed of an n-type silicon germanium, and having a silicon composition ratio exceeding 50% but less than 100% and a conductivity of 0.1 to 50 S/cm, comprising the steps of:

a) measuring resistances on the resistance-temperature sensor at first and second fixed points of temperature;

b) calculating, based on the resistances at the first and second fixed points of temperature, an interpolation equation by a cubic spline function taking a logarithm of a temperature between both the first and second fixed points of temperature as a function of a logarithm of a resistance; c) calculating interpolation values of a temperature corresponding to the resistance between both the first and second fixed points of temperature according to the interpolation equation; and d) calculating a single Chebyshev's polynomial using the interpolation value found at the step (c).

7. A method for deciding interpolation values by a magnetoresistance effect in a magnetic field on a resistance-temperature sensor using a micro-crystalline semiconductor thin film, comprising the steps of:

a) deciding a direction of a magnetic field and the flux density of the magnetic field;

b) measuring resistances on a resistance-temperature sensor under flux density of a first application magnetic field and a second application magnetic field, at a predetermined temperature; and c) calculating, based on the resistance values under the first and second application fields, an interpolation equation by a cubic spline function taking, as a function of a flux density of an application magnetic field, a magnetoresistance effect by the application magnetic field on the resistance-temperature sensor in an application magnetic field range between both the first and second application magnetic fields.

8. A method for deciding interpolation values by a magnetoresistance effect in a magnetic field on a resistance-temperature sensor using a micro-crystalline semiconductor thin film being formed of an n-type silicon germanium, and having a silicon composition exceeding 50% but less than 100% and a conductivity of 0.1 to 50 S/cm, comprising the steps of:

a) deciding a direction of a magnetic field and flux density of the magnetic field;

b) measuring resistances of the resistance-temperature sensor under flux density of a first application magnetic field and a second application magnetic field, at a predetermined temperature; and c) calculating, based on the resistance value under the first and second application fields, an interpolation equation by a cubic spline function taking, as a function of a flux density of an application magnetic field, a magnetoresistance effect by the application magnetic field on the resistance-temperature sensor in an application magnetic field range between both the first and second application magnetic fields.

9. A method for deciding a value of interpolation by a magnetoresistance effect in a magnetic field on a resistance-temperature sensor using a micro-crystalline semiconductor thin film, comprising the steps of:

a) deciding a direction of a magnetic field and flux density of the magnetic field;

b) measuring resistances of the resistance-temperature sensor under a flux density of a first application magnetic field and a flux density of a second application magnetic field, at a predetermined temperature;

c) calculating, based on the resistances under the first and second application magnetic field, an interpolation equation by a cubic spline function taking, as a function of a flux density of an application magnetic field, a magnetoresistance effect by the application magnetic field on the resistance-temperature sensor in the application magnetic field range between both the first and second application magnetic fields;

d) calculating, based on the interpolation equation, interpolation values of the resistances under the first and second application magnetic fields; and e) calculating finding a single Chebyshev's polynomial using the interpolation values found at the step (d).

10. A method for deciding an interpolation value by a magnetoresistance effect in a magnetic field on a resistance-temperature sensor with the use of a micro-crystalline semiconductor thin film being formed of n-type silicon germanium having a silicon composition ratio exceeding 50% but less than 100% and a conductivity of 0.1 to 50 S/cm, comprising the steps of:

a) deciding a direction of a magnetic field and strength of the magnetic field;

b) measuring resistances of the resistance-temperature sensor under a flux density of a first application magnetic field and a second application magnetic field, at a predetermined temperature;

c) calculating, based on the resistances under the first and second application magnetic fields, an interpolation equation by a cubic spline function taking, as a function of a flux density of an application magnetic field, a magnetoresistance effect by the application magnetic field on the resistance-temperature sensor in the application magnetic field range between both the first and second application magnetic fields;

d) calculating interpolation values of the resistances in the application magnetic field range between the first and second application magnetic fields according to the interpolation equation; and e) calculating a single Chebyshev's polynomial using the interpolation values found at the step (d).

11. A method for deciding an interpolation value by a magnetoresistance effect in a magnetic field on a resistance-temperature sensor using a micro-crystalline semiconductor thin film, comprising the steps of: a) deciding a direction of a magnetic field and strength of the magnetic field;

b) measuring resistances of a resistance-temperature sensor under a flux density of a first application magnetic field and a second application magnetic field, at a predetermined temperature; and c) calculating, based on the resistances under the first and second application magnetic fields, an interpolation equation by a method of least squares taking, as a function of a logarithm of a magnetoresistance effect on the resistance-temperature sensor in the application magnetic field between both the first and second application magnetic fields.

12. A method for deciding an interpolation value by a magnetic resistance effect on a resistance-temperature sensor with the use of a micro-crystalline semiconductor thin film being formed of n-type silicon germanium and having a silicon composition ratio exceeding 50% but less than 100% and a conductivity of 0.1 to 50 S/cm, comprising the steps of:

a) deciding a direction of a magnetic field and strength of the magnetic field;

b) measuring resistances on the resistance temperature sensor under strength of a first application magnetic field and a second application magnetic field, at a predetermined temperature; and c) calculating, based on the resistances under the first and second application magnetic fields, an interpolation equation by a method of least squares taking, as a function of a logarithm of a magnetic density, a logarithm of a magnetoresistance effect on the resistance-temperature sensor in an application magnetic field range between both the first and second application magnetic fields.

13. A temperature sensor system comprising:

a temperature-sensitive device including an insulating substrate, a micro-crystalline semiconductor thin film formed on the insulating substrate and formed of n-type silicon germanium and having a silicon composition ratio exceeding 50% but less than 100% and a conductivity of 0.1 to 50 S/cm, a pair of first electrodes to which the micro-crystalline semiconductor thin film is connected to flow a measuring current through the micro-crystalline semiconductor thin film and a pair of second electrodes connected to the micro-crystalline semiconductor thin film so as to detect a voltage drop induced by the measuring current in the micro-crystalline semiconductor thin film;

a current source for supplying the measuring current to the pair of first electrodes of the temperature-sensitive device;

voltage measuring means for measuring a voltage output to the second electrodes in the temperature-sensitive device;

temperature interpolation value deciding means for, based on the measured voltage by the voltage measuring means, measuring a resistance of the temperature-sensitive device in set first and second fixed points of temperature and for deciding a temperature interpolation value by a cubic spline function based on the resistance; and temperature calculating means for calculating a temperature of a to-be-measured section by, based a voltage measured by the voltage measuring means, measuring the resistance of the temperature-sensitive device in a state to have the temperature-sensitive device set at the to-be-measured section and interpolating the resistance based on the temperature interpolation value decided by the temperature interpolation value deciding means, the first fixed point of the temperature being 1.4K and the second fixed point of temperature being 273K.

14. The temperature sensor system according to claim 13, wherein further comprises display means for displaying temperature at the to-be-measured section which is calculated by the temperature calculating means.

15. The temperature sensor system according to claim 13, wherein further comprises temperature control means for controlling temperature at the to-be-measured section according to an output from the temperature calculating means.

16. The temperature sensor system according to claim 13, wherein further comprises storing means for storing a temperature interpolation value decided by the temperature interpolation value deciding means.

17. A temperature sensor system comprising:

a temperature-sensitive device including an insulating substrate, a micro-crystalline semiconductor thin film formed over the insulating substrate and formed of n-type silicon germanium and having a silicon composition ratio exceeding 50% but less than 100% and a conductivity of 0.1 to 50 S/cm, a pair of first electrode connected to the micro-crystalline semiconductor thin film to flow a measuring current and a pair of second electrodes connected to the micro-crystalline semiconductor thin film to detect a voltage drop induced by the measuring current;

a current source for supplying the measuring current to the first electrodes in the temperature-sensitive device;

voltage measuring means for measuring a voltage output to the second electrodes in the temperature-sensitive device;

temperature interpolation value deciding means for, based on the voltage measured by the voltage measuring means, measuring a resistance of the temperature-sensitive device in a state to have the temperature-sensitive device set at a predetermined temperature under the flux density of first and second magnetic fields and for deciding a temperature value of interpolation by a cubic spline function on the basis of the resistance value; and temperature calculating means for calculating a temperature at a to-be-measured section by, based on the voltage measured by the voltage measuring means, measuring a resistance of the temperature-sensitive device in a state to have the temperature-sensitive device set at the to-be-measured section.

18. The temperature sensor system according to claim 17, wherein further comprises display means for displaying a temperature at the to-be-measured section calculated by the temperature calculating means.

19. The temperature sensor system according to claim 17, wherein further comprises temperature control means for controlling a temperature on the to-be-measured section according to an output from the temperature calculating means.

20. The temperature sensor system according to claim 17, wherein further comprises storing means for storing a temperature interpolation value decided by the temperature interpolation value deciding means.

* * * * *